(12) United States Patent
Golesh et al.

(10) Patent No.: US 11,406,869 B2
(45) Date of Patent: Aug. 9, 2022

(54) SYSTEMS AND METHODS FOR POWER METER CALIBRATION

(71) Applicant: Foundation Fitness, LLC, Portland, OR (US)

(72) Inventors: Eric Golesh, Arvada, CO (US); Donald A. Warbritton, IV, Boulder, CO (US)

(73) Assignee: Foundation Fitness, LLC, Portland, OR (US)

( * ) Notice: Subject to any disclaimer, the term of this patent is extended or adjusted under 35 U.S.C. 154(b) by 594 days.

(21) Appl. No.: 16/209,710

(22) Filed: Dec. 4, 2018

(65) Prior Publication Data

US 2019/0175986 A1 Jun. 13, 2019

Related U.S. Application Data

(63) Continuation-in-part of application No. 16/133,256, filed on Sep. 17, 2018, which is a continuation of
(Continued)

(51) Int. Cl.
*A63B 24/00* (2006.01)
*A63B 23/04* (2006.01)
(Continued)

(52) U.S. Cl.
CPC ...... *A63B 24/0062* (2013.01); *A63B 21/4034* (2015.10); *A63B 21/4049* (2015.10);
(Continued)

(58) Field of Classification Search
CPC ............ A63B 24/0062; A63B 23/0476; A63B 24/0087; A63B 22/0605; A63B 21/4034;
(Continued)

(56) References Cited

U.S. PATENT DOCUMENTS

| | | | | | |
|---|---|---|---|---|---|
| 5,257,540 | A | * | 11/1993 | Bower | A61B 5/221 |
| | | | | | 482/900 |
| 2012/0330572 | A1 | * | 12/2012 | Longman | B62M 3/00 |
| | | | | | 702/44 |

(Continued)

FOREIGN PATENT DOCUMENTS

| | | |
|---|---|---|
| GB | 2456821 A | 7/2009 |
| WO | 2012/025314 | 3/2012 |

OTHER PUBLICATIONS

International Searching Authority, International Search Report and Written Opinion, issued for International Application No. PCT/US2018/063900, dated Feb. 11, 2019 (9 pages).

*Primary Examiner* — Xin Y Zhong
(74) *Attorney, Agent, or Firm* — Polsinelli PC

(57) ABSTRACT

A method of calibrating a crank arm-mounted power meter includes receiving an angle measurement from a first sensor disposed on a crank arm, the angle measurement corresponding to an angular orientation of the crank arm. A predicted load measurement is then calculated based on the angle measurement and weight data for the crank assembly including the crank arm and stored in memory. A load measurement corresponding to a load on the crank arm is obtained and a zero offset value is then calculated by determining a difference between the predicted load measurement and the load measurement. Power calculation logic for determining power applied to the crank arm is then updated using the zero offset value.

20 Claims, 20 Drawing Sheets

Related U.S. Application Data application No. 15/232,631, filed on Aug. 9, 2016, now Pat. No. 10,076,681, which is a continuation of application No. 13/356,487, filed on Jan. 23, 2012, now Pat. No. 9,417,144.

(60) Provisional application No. 62/594,407, filed on Dec. 4, 2017, provisional application No. 61/435,207, filed on Jan. 21, 2011.

(51) Int. Cl.
*G01L 3/24* (2006.01)
*A63B 22/06* (2006.01)
*A63B 21/00* (2006.01)
*G01L 25/00* (2006.01)

(52) U.S. Cl.
CPC ...... *A63B 22/0605* (2013.01); *A63B 23/0476* (2013.01); *A63B 24/0087* (2013.01); *G01L 3/242* (2013.01); *G01L 25/006* (2013.01); *A63B 2022/0611* (2013.01); *A63B 2220/51* (2013.01); *A63B 2220/54* (2013.01); *A63B 2220/833* (2013.01); *A63B 2225/50* (2013.01)

(58) Field of Classification Search
CPC ............ A63B 21/4049; A63B 2220/51; A63B 2220/833; A63B 2225/50; A63B 2220/54; A63B 2022/0611; A63B 2024/0068; A63B 2071/065; A63B 2209/08; A63B 2220/17; A63B 2220/24; A63B 2220/40; A63B 2225/02; A63B 71/0622; A63B 2071/0627; G01L 25/006; G01L 3/242
See application file for complete search history.

(56) References Cited

U.S. PATENT DOCUMENTS

| | | | |
|---|---|---|---|
| 2013/0210583 A1* | 8/2013 | Kametani | ................ B62J 99/00 482/8 |
| 2017/0248420 A1 | 8/2017 | Fyfe et al. | |

* cited by examiner

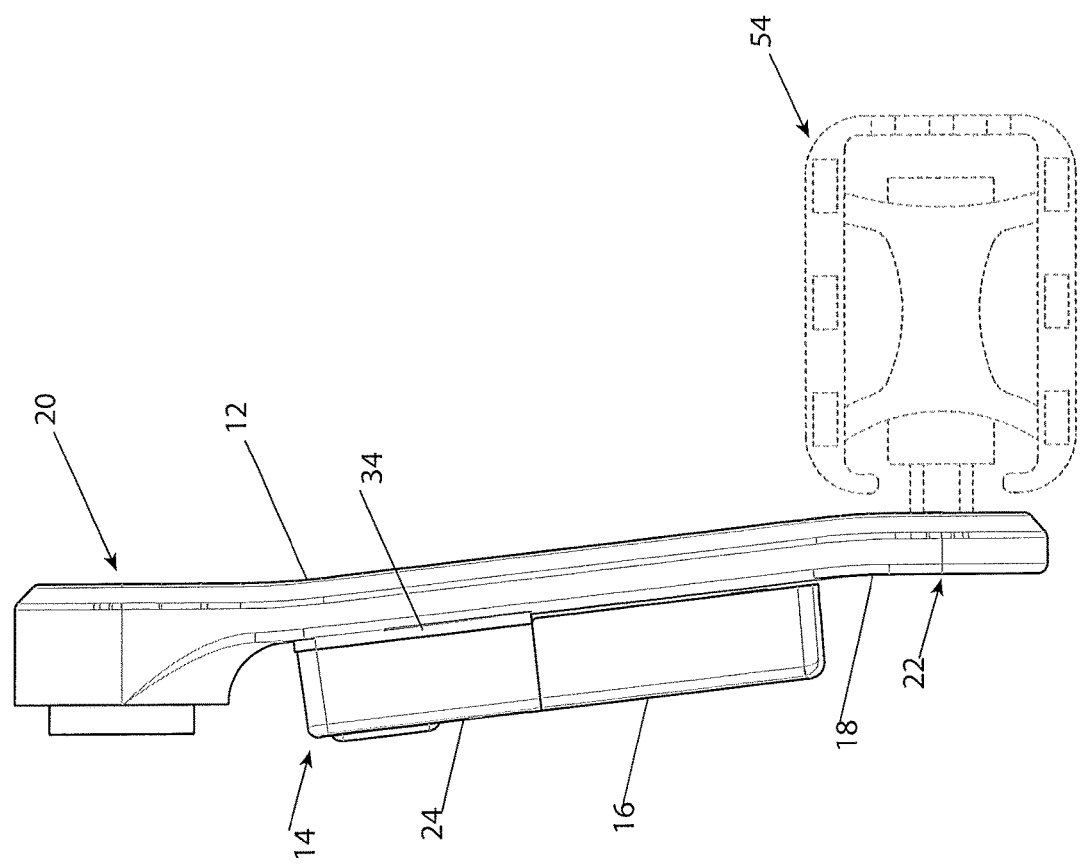

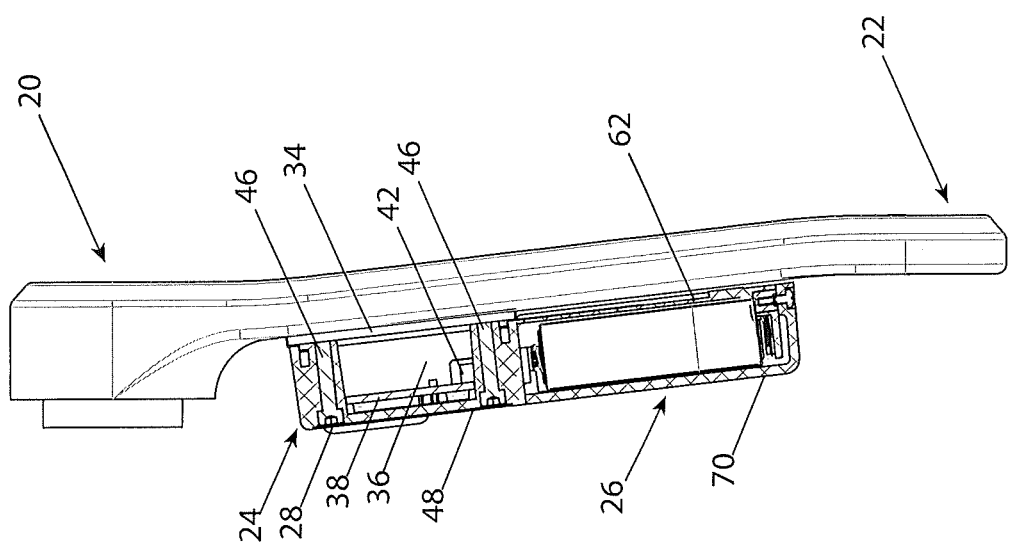

SYSTEMS AND METHODS FOR POWER METER CALIBRATION

CROSS-REFERENCE TO RELATED APPLICATION

The present application is a non-provisional application claiming priority under 35 U.S.C. § 119 to provisional application No. 62/594,407 titled "Systems and Methods for Power Meter Calibration," filed Dec. 4, 2017, which is hereby incorporated by reference herein. The present application is also a continuation-in-part of U.S. patent application Ser. No. 16/133,256 titled "Apparatus, System and Method for Power Measurement," filed Sep. 17, 2018, which is a continuation of U.S. patent application Ser. No. 15/232,631 titled "Apparatus, System and Method for Power Measurement," filed Aug. 9, 2016, now U.S. Pat. No. 10,076,681 issued Sep. 18, 2018, which is a continuation of U.S. patent application Ser. No. 13/356,487 titled "Apparatus, System and Method for Power Measurement," filed Jan. 23, 2012, now U.S. Pat. No. 9,417,144 issued Aug. 16, 2016, which is a non-provisional application claiming priority under 35 U.S.C. § 119(e) to provisional application No. 61/435,207 filed Jan. 21, 2011 and entitled "Apparatus, System and Method for Power Measurement," all of which are also hereby incorporated by reference herein.

TECHNICAL FIELD

Aspects of the present disclosure involve systems and methods for calibrating a power measurement device used in measuring power, the power measurement device for use with a crank assembly of a bicycle, exercise bicycle or other exercise and fitness equipment.

BACKGROUND

Fitness training using a power meter, particularly for bicyclists, is increasing popular. Power meters measure and display the rider's power output, typically displayed in Watts, used for pedaling. Power meters of many different sorts have been adapted for use on bicycles, exercise bicycles and other fitness equipment. Many of these designs are overly complicated, prone to error, and/or prone to failure, and also tend to be relatively expensive. As such, many health clubs have yet to add power meters to their indoor cycling and exercise bikes, and many riders find the expense of adding power to their road or mountain bike prohibitive.

Often, rather than power meters, such clubs and riders, use heart rate monitors for training and to provide feedback for a rider. These devices also may provide information concerning speed, distance traveled, and calories, but that information cannot include or be based upon power measurements and thus may not be as accurate as values derived form or taking into account power. Measuring heart rate, however, while providing useful information for measuring performance, is not as good as measuring power in providing consistent and useful information to the rider. For example, when rapidly accelerating or sprinting, heart rate lags behind the rider's effort whereas power provides a nearly instantaneous reflection of the rider's effort. When a rider is dehydrated, malnourished, tired, sick, injured, or otherwise not in optimal riding condition, the rider may conduct a workout at a typical heart rate but their power at that heart rate may be considerably less than typical. Thus, the rider can identify and possibly rectify the cause of the non-optimal condition. Finally, measuring and comparing power over an extended period of training, can help a rider identify training that helps increase power and those that do not and thereby continually refine and improve their training regimen.

With these thoughts in mind among others, aspects of the power meter and related power measurement techniques of the present disclosure, including calibration of the power meter, were conceived.

SUMMARY

In one aspect of the present disclosure, a method of calibrating a crank arm-mounted power meter is provided. The method includes receiving an angle measurement from a first sensor of a power meter assembly, the power meter assembly disposed on a crank arm of a crank assembly and the angle measurement corresponding to an angular orientation of the crank arm. The method further includes calculating, using a processor of the power meter assembly, a predicted load measurement based on the angle measurement and weight data for the crank assembly stored in a memory of the power meter assembly. A load measurement corresponding to a load on the crank arm is also received from a second sensor of the power meter assembly. A zero offset value is then calculated by determining a difference between the predicted load measurement and the load measurement. Power calculation logic for determining power based on load measurements obtained from one or more sensors disposed on the crank arm is then updated using the zero offset value.

In another aspect of the present disclosure, a crank arm is provided. The crank arm includes a crank arm body and a power meter assembly coupled to the crank arm body. The power meter assembly includes a processor communicatively coupled to a memory. The processor is configured to obtain each of an angle measurement of the crank arm body and a load measurement of loads acting on the crank arm body. The processor is further configured to calculate a predicted load value based, at least in part, on the angle measurement and weight data stored in the memory. The process is also configured to calculate a zero offset value by determining a difference between the predicted load value and the load measurement and to update power calculation logic executable by the processor using the zero offset value.

In yet another aspect of the present disclosure, a method of calibrating a crank arm-mounted power meter is provided. The method includes disposing a crank arm including a power meter in a plurality of angular orientations about a spindle, the power meter including a processor. For each of the plurality of angular orientations, a respective load measurement corresponding to a load on the crank arm as measured at the angular orientation is obtained at the processor. The method further includes storing calibration data in a memory communicatively coupled to the processor, where the calibration data includes each of the plurality of angular orientations and their respective load measurements.

BRIEF DESCRIPTION OF THE DRAWINGS

Example embodiments are illustrated in referenced figures of the drawings. It is intended that the embodiments and figures disclosed herein are to be considered illustrative rather than limiting.

FIG. 4A is a top view of the crank arm and power measurement apparatus shown in FIG. 1;

FIG. 4B is a top view of the crank arm and power measurement apparatus shown in FIG. 1, with some components of the power measurement apparatus hidden to illustrate internal components;

DETAILED DESCRIPTION

Figure 1:
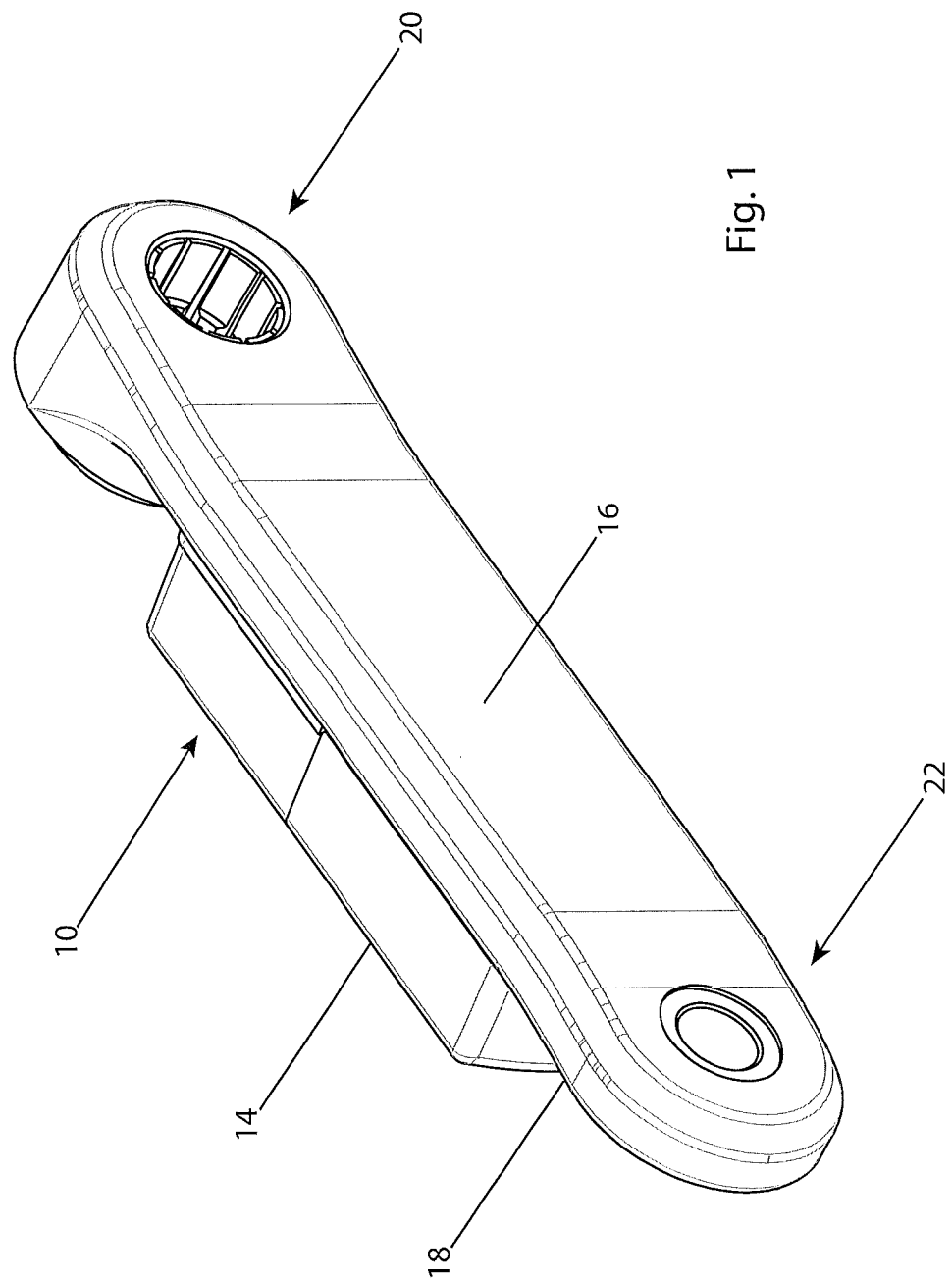
FIG. 1 is an isometric view of a crank arm with a power measurement apparatus connected thereto.
Figure 2:
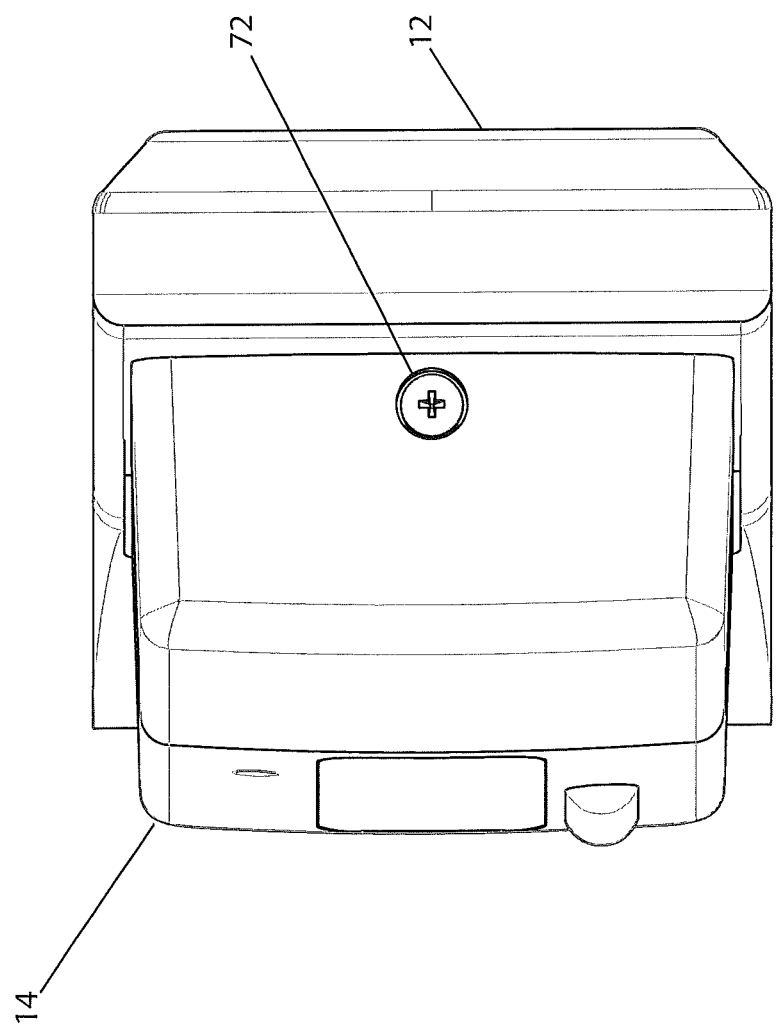
FIG. 2 is a front view of the crank arm and power measurement apparatus shown in FIG. 1.
Figure 3:
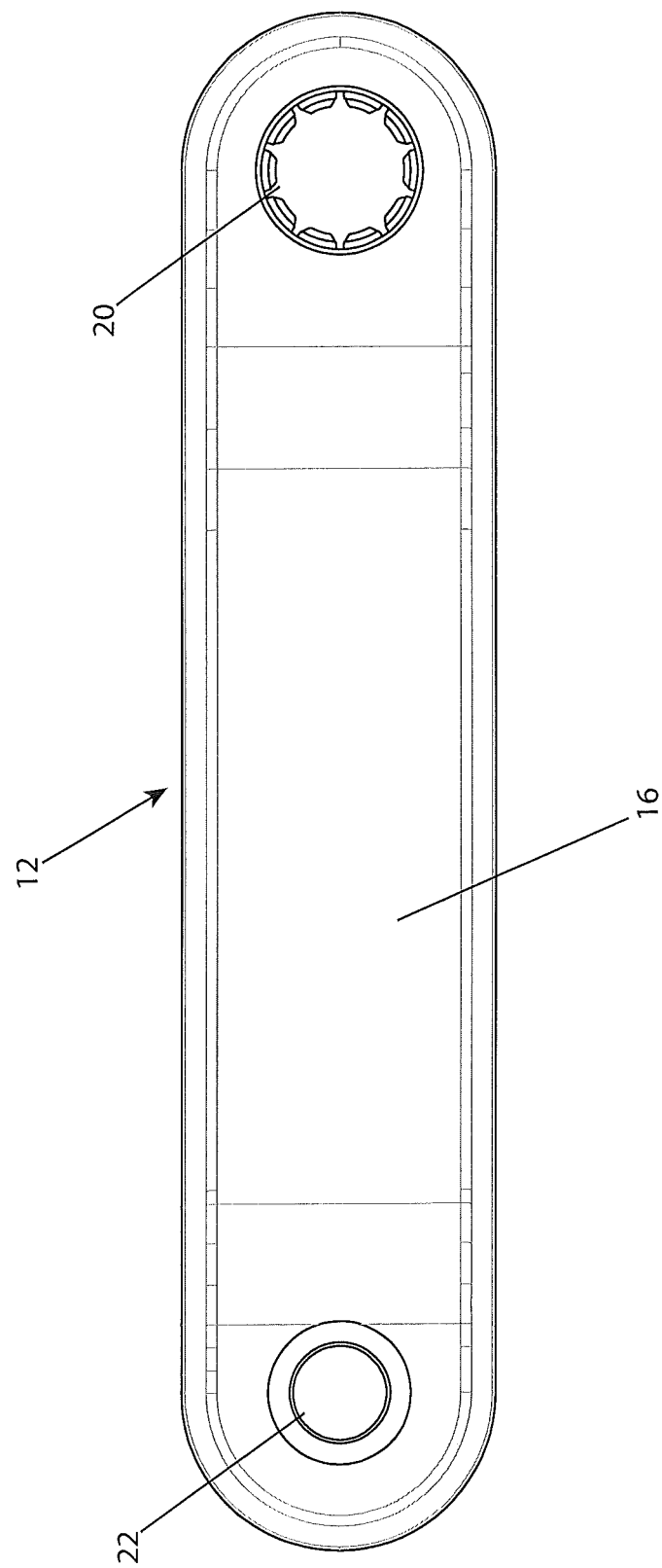
FIG. 3 is a left side view of the crank arm shown in FIG. 1, and particularly showing the outside of the crank arm from which a pedal would extend.
Figure 5A:
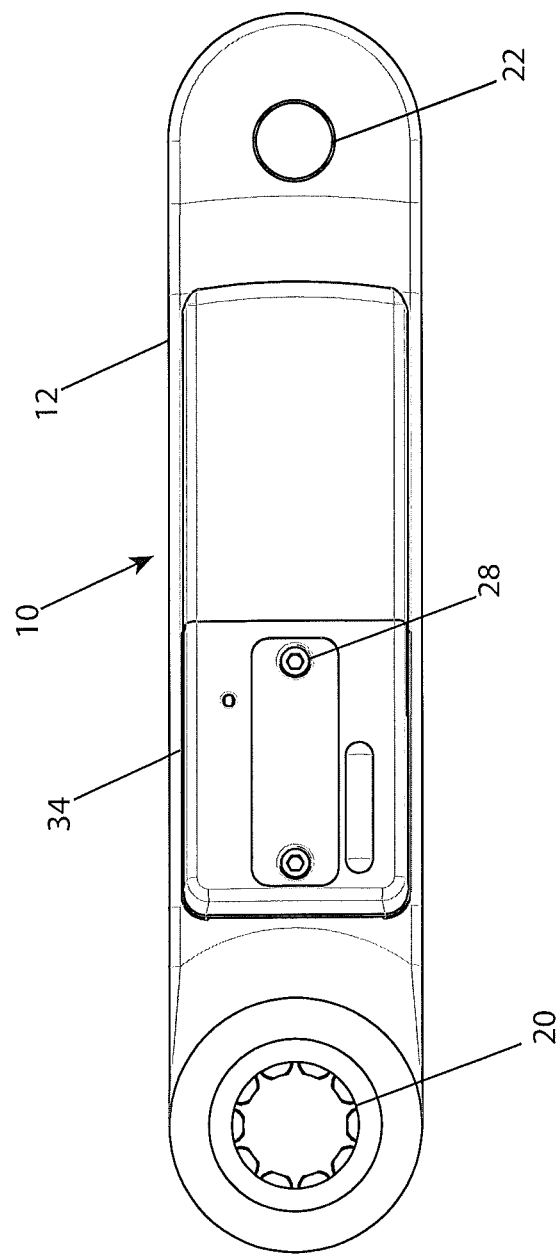
FIG. 5A is a right side view of the crank arm and power measurement apparatus shown in FIG. 1, and particularly illustrated the inside of the crank arm to which the power measurement apparatus is connected.
Figure 5B:
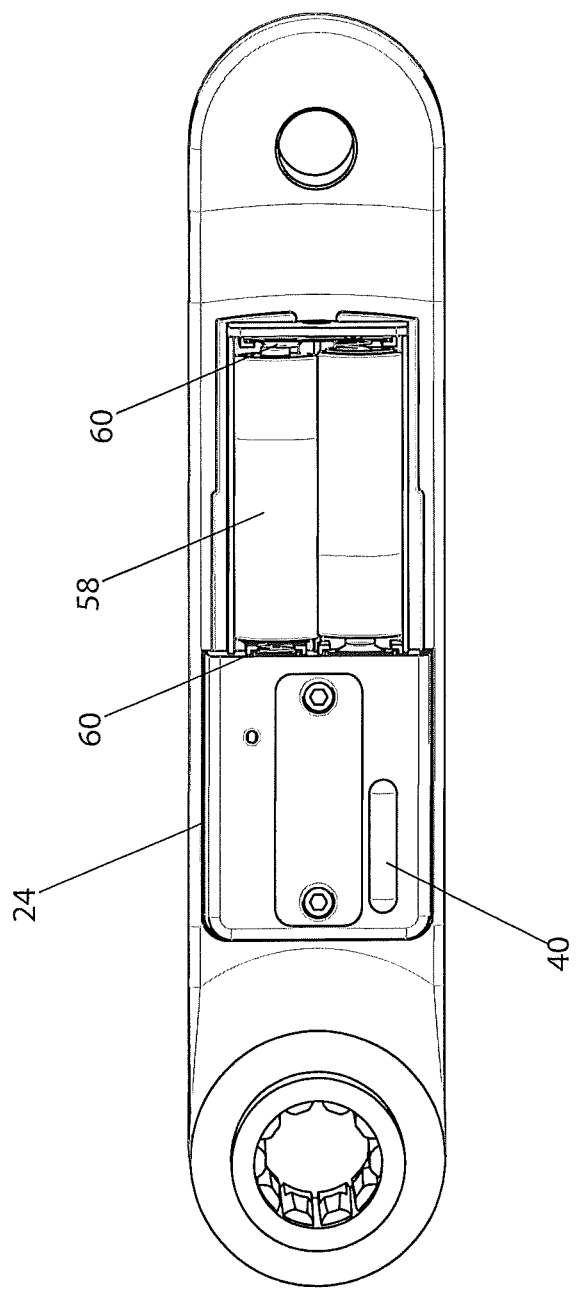
FIG. 5B is a right side view of the crank arm and power measurement apparatus shown in FIG. 1, and particularly illustrated the inside of the crank arm to which the power measurement apparatus is connected, with some components of the power measurement apparatus hidden to illustrate internal components.

Aspects of the present disclosure involve a power measurement assembly mounted on a crank arm of an exercise bicycle, indoor cycling bicycle, bicycle, or other form of mobile device or exercise equipment. In one particular implementation, each of the components that measure power, calculate power, and transmit the power calculation to a display is mounted on a crank arm. In one particular implementation, the display wirelessly receives power data and displays a power value, the display may be mounted anywhere desirable, such as on a handlebar, the display may be incorporated in a wrist watch, or the power data may be transmitted to other devices, such as a smart phone, for a real-time display and/or storage. Existing equipment that includes a crank may be easily retrofitted with a crank arm that wirelessly transmits a power measurement.

In the example implementation shown herein, a power measurement device 10 is mounted on a crank arm 12. The crank arm 12 shown is particularly suited for an indoor cycling (IC) bicycle; however, the crank arm may be used on other forms of exercise bicycles, whether upright, recumbent, or otherwise, may be used with bicycles, may be used with other forms of fitness equipment that employ a crank arm, such as elliptical trainers, stair climbing machines, and the like, and may be used with any device that includes a crank arm and where power measurement or the components of power measurement (e.g. torque, force, RPM) may be desired or otherwise beneficial. Suitable indoor cycling bicycling bicycles that may include a crank arm with the described power measurement device are illustrated in U.S. patent application Ser. Nos. 13/267,479 and 13/267,719 titled "Exercise Bicycle with Bicycle Seat and Handlebar Adjustment Assemblies" and "Exercise Bicycle with Magnetic Flywheel Brake" respectively, and which are both hereby incorporated by reference herein.

Referring to the various drawings and particularly FIGS. 1, 2, 4A, 4B, 5A, 5B, 6 and 10, the power measurement device 10 includes a housing 14 secured to an inside portion 18 of the crank arm between a bottom bracket aperture 10 and a pedal aperture 22. Various power measurement electronics are provided within the housing. The inside portion 18 of the crank arm, where the housing 14 is mounted, is that portion adjacent or facing the bicycle frame, drive sprocket, etc. In various possible other implementations, the housing 14 may also be secured to other portions of the crank arm, such as the top, bottom or outside portion. However, securing the housing to the inside portion of the crank arm shields the housing and attendant power measurement components from inadvertent contact with a rider or other obstacle. For example, if a rider's foot were to slip off the pedal, the foot could contact the housing if it was secured to some other portion of the crank arm. However, on the inside of the crank arm, the rider's foot would not contact the housing.

Referring now to FIG. 4A, the housing 14 includes a mounted portion 24 and a cantilever portion 26. The mounted portion 24 is secured, such as through a pair of bolts 28, to a machined recess 30 in the crank arm. It is also possible to attach the housing 14 to the crank using tape, adhesive or other mechanisms. As discussed further below, one or more strain gauges are mounted to the crank arm within the machined recess 30. The mounted portion 24 defines a male portion with a circumferential flange 32 such that the male portion is dimensioned to fit snugly within the machined recess. A gasket 34 may be provided in a circumferential channel defined in the mounted portion adjacent the crank. When assembled, the gasket is sandwiched between the mounted portion of the housing and the crank arm to block moisture, such as sweat from a rider and water or mud from a trail or road, from entering into the recessed area or into the housing.

The mounted portion further defines a cavity 36 within which are provided a circuit board 38, reed switch 40 (attached to the circuit board) and a port 42 by which electrical components on the circuit board may be accessed or otherwise communicated with to download software or firmware updates as well as to access information. Thus, besides the strain gauge and electrical connections thereto, the various electrical components that process the strain gauge outputs and transmit the data are located within the cavity of the housing. In one particular arrangement, each of a pair of bolts 28 extends through the mounted housing and is secured to matching threaded apertures 44 defined in the recessed portion of the crank. The printed circuit 38 board extends between and is connected to a pair of molded cylinders 46 through which the bolts 28 pass. The molded cylinders 46 form an integral part of the mounted portion 24 of the housing and extend between an outer wall 48 of the mounted portion and the recess in the crank arm. The cylinders may be dimensioned so that it engages the crank and prevents the housing from being cracked while tightening the bolts.

The power assembly discussed herein may also be adhered, non-mechanically fastened, to any form of existing crank arm without modifying the crank. In such an example, the power assembly housing may or may not include a cantilever portion and will not include a male portion configured to engage a recess. Strain gauges may be adhered directly to a particular crank wall, without physical modification of the side wall. Some surface preparation (cleaning, etc.) may be required before adhering the strain gauges to the crank wall, however. A lower surface of the power assembly housing will define an opening suitable to cover the strain gauges and receive leads connected to the strain gauges. Given the vast number of possible crank arms to which the assembly might be adhered, it is possible that the lower surface and/or wall engaging the crank arm surface, may be contoured to match the crank arm wall contour of a given crank arm. Alternatively, a plurality of different adapters may be fabricated so that a common power assembly housing may mate to different crank arms. In such a configuration, and adapter may have a first side that has a matching contour of a given crank arm, and a second side that has a matching contour of the common power assembly housing. The housing in any given configuration includes the processor, batteries, and wireless transmission capability. Accordingly, the system may be mated to any of a variety of existing crank arms without modification of the crank arm (e.g., without tapping the crank arm to accepts bolts which could affect the structural integrity of the crank), and the power assembly will wireless transmit a power value that may be used to display the power being exerted while riding and/or exercising on a device including the crank. With such a system, there is no need to purchase or replace existing drive train components. Rather, a rider may simply retrofit or purchase a crank arm (with power assembly) for his or her existing drive train.

Figure 6:
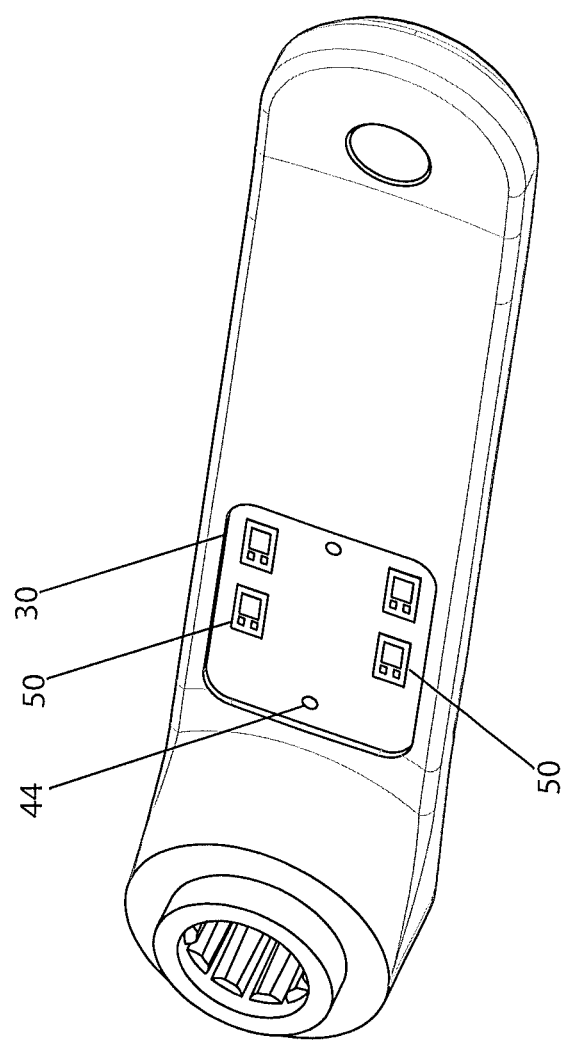
FIG. 6 is an isometric view of the inside of the crank arm particularly illustrating a recess, which may be machined or directly molded into the crank arm, within which are four resistive reed switches that provide a fluctuation in resistance proportional to the force applied on a pedal connected to the crank.
Figure 7:
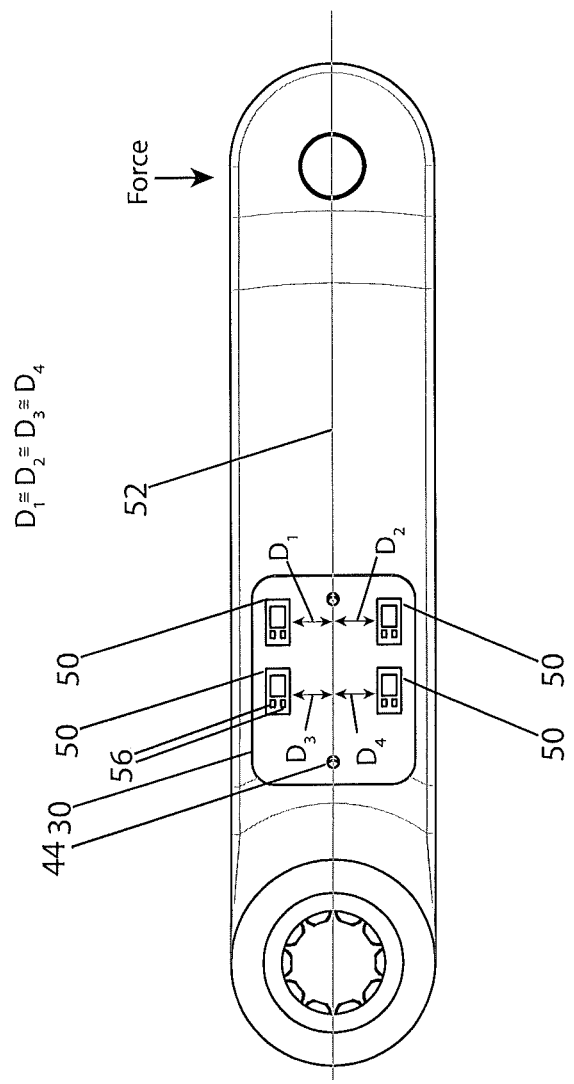
FIG. 7 is a right side view of the crank arm as shown in FIG. 6 and providing further detail as to the arrangement of the strain gauges within the recess of the crank arm.
Figure 8:
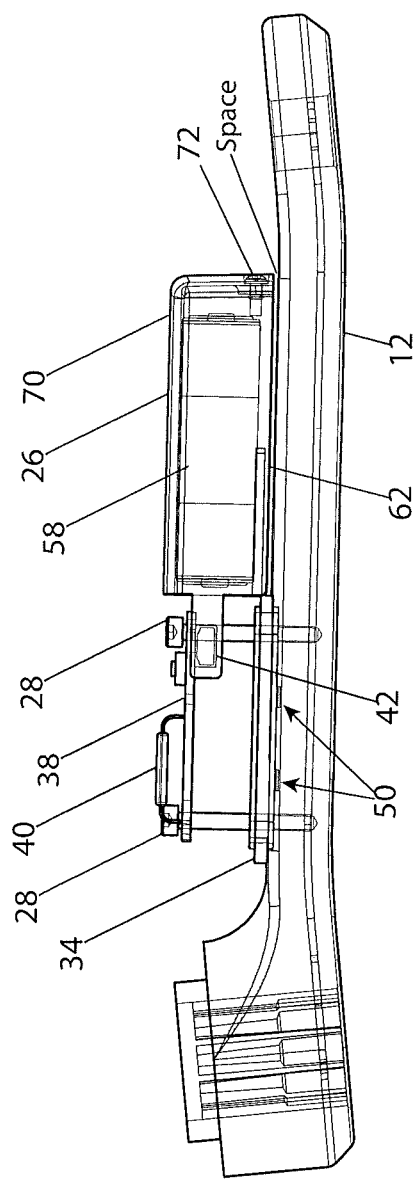
FIG. 8 is a top view of the crank arm and power measurement device with various components hidden to illustrate internal components.
Figure 9:
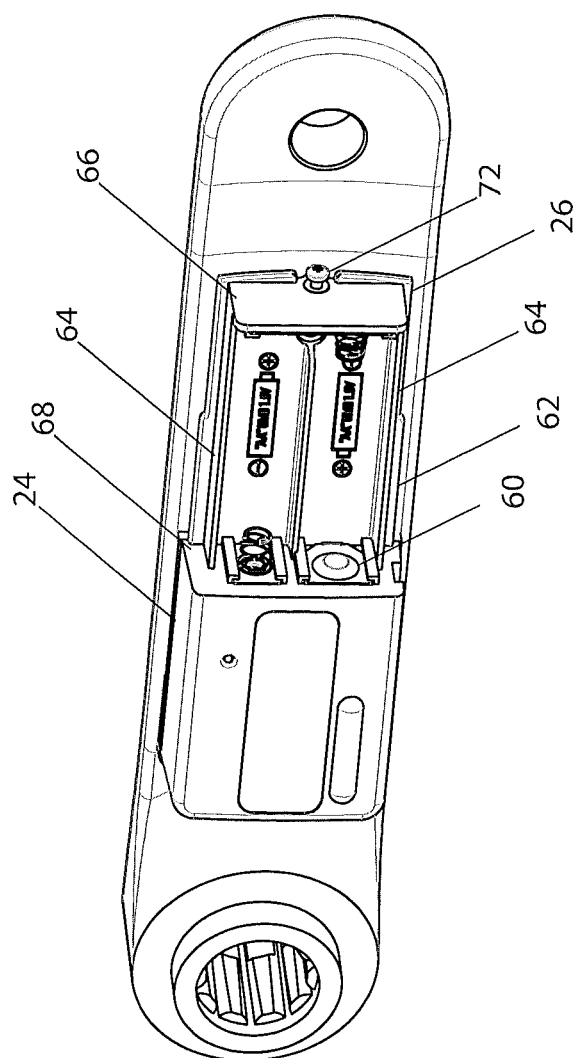
FIG. 9 is an isometric view of the crank arm and power measurement apparatus with the cover of the cantilevered portion of the housing removed.
Figure 10:
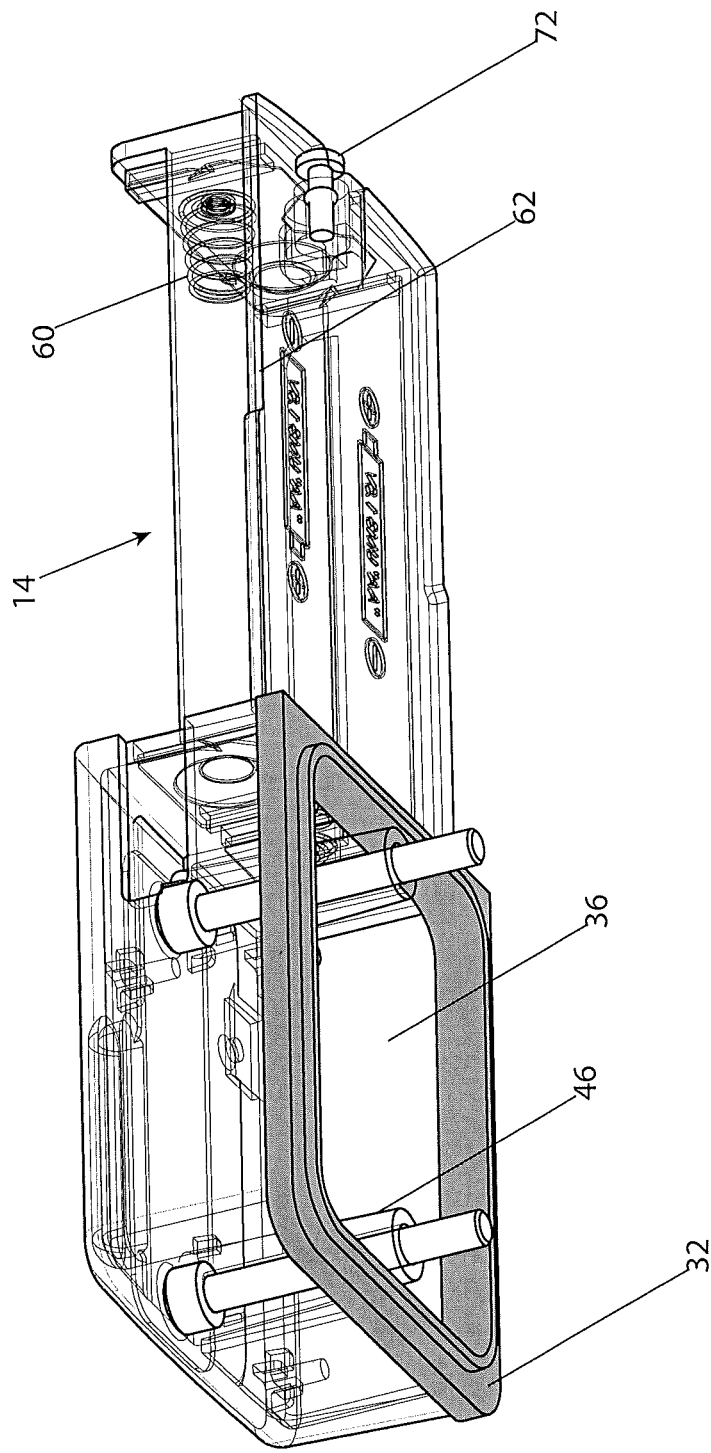
FIG. 10 is an isometric view of the power measurement apparatus with various components hidden.

As shown in FIGS. 6, 7, 8 and others, within the recessed portion 30 of the crank arm, one or more strain gauges 50 may be provided. In the implementation shown, two pairs of strain gauges are shown with one member of each pair disposed equidistant from a centerline 52 of the crank arm to an opposing pair. The strain gauges are placed on the inside wall of the crank arm. In one particular implementation, the strain gauges are glued to a smooth flat surface of the crank. While a machined or otherwise provided recess is shown, the power measurement apparatus may be applied to an existing crank arm with little or no preprocessing of the crank arm. The machined recess 30 shown is provided with a smooth flat bottom upon which the strain gauges are secured. To assist with consistency between crank assemblies, a template may be used to apply the strain gauges to the crank surface within the machined recess. Alternatively, the strain gauge may be pre-mounted on a substrate in a desired configuration, and the substrate mounted to the crank. The side walls of the machined recess also provide a convenient way to locate the housing.

In the implementation shown, the strain gauges 50 are placed relatively closer to where the crank is mounted at the bottom bracket 45 compared to where torque is applied to the crank arm at the pedal 54. As such, with the strain gauges 50 placed relatively closer to the pivot point of the crank arm (i.e., the bending point of the theoretical beam), there is greater strain gauge output resolution providing a larger output voltage of the Wheatstone bridge circuit, discussed herein, compared to having the strain gauges been placed relatively closer to the pedal point given the same torque. With greater resolution, the output voltage is large relative to noise and other spurious voltage outputs therefore, the circuit requires relatively less filtering, amplification and the like to accurately extract the voltage reading of the circuit.

As shown, the strain gauges 50 may be placed on the same wall of the crank arm and are arranged in the same relative direction. In one particular example, the strain gauges are each parallel to the other gauges. Stated differently, each strain gauge defines a longitudinal axis across which the strain gauge is response to tension or compression. Each of the strain gauges is arranged such that the longitudinal axes are parallel. Hence, in the example of FIG. 7, with the illustrated downward force on the crank, the upper strain gauges (SG1 and SG2) will be in tension while the lower strain gauges (SG3 and SG4) will be placed in compression. The arrangement, through its geometry, filters out forces not relevant to measuring power applied to the cranks causing rotation about the bottom bracket. For example, should a transverse force (e.g. normal to plane defined by the 2 pair of gauges) be applied to the pedal, such as if a rider is applying a force that has both downward and non-downward forces on the pedal, then all of the strain gauges will compress or tension in the same way from the transverse force and cause a 0 voltage output of the Wheatstone bridge circuit. Similarly, non-tangential forces applied to the pedal are automatically normalized to a tangential force measurement.

Additionally, the strain gauges are positioned on the same wall or surface of the crank arm. In the particular examples set out herein, the strain gauges are each on an inside wall of the crank arm. The inside wall is the wall facing an opposing crank or otherwise the frame of the exercise bicycle when the crank is assembled on the exercise bicycle. The assembly can be positioned on other walls, depending on the configuration. The inside wall, however, provides some protection of inadvertent contact. The inside wall (or opposite outside wall) experiences less deflection during riding as compared to the upper and lower walls (those walls or surfaces connecting the inside and outside walls). Placing the strain gauges on those upper and/or lower walls, would provide greater strain gauge bridge output for the same forces thereby providing potentially higher resolution bridge outputs. Nonetheless, those wall are potentially at risk for much greater inadvertent contact, whether on an indoor bike or outside bike.

Figure 11:
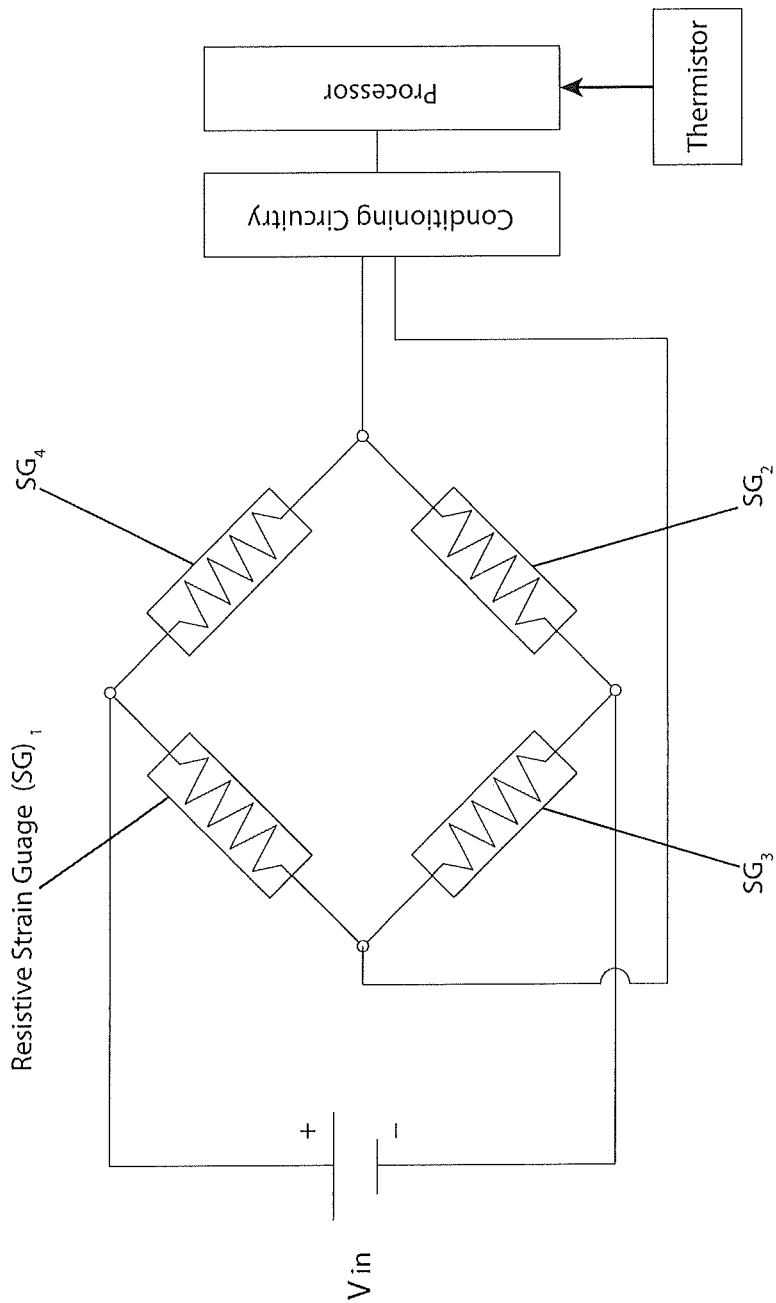
FIG. 11 is a circuit diagram of a Wheatstone bridge circuit and related processing components that may be used to provide a voltage output proportional to the force applied to the crank arm.

The strain gauges 50 each include leads 56 connected in a Wheatstone bridge circuit arrangement. For example, as shown in FIG. 11, the strain gauges are connected in the circuit arrangement shown. Other circuit arrangements are possible that use more or less strain gauges, such as a half bridge configuration. An input voltage is applied to the bridge circuit and the output voltage of the circuit is proportional to the tangential bending force (torque) applied to the crank arm. The output voltage may be applied to some form of conditioning and amplification circuitry, such as a differential amplifier and filter that will provide an output voltage to the processor. It is further possible to use an analog to digital converter to convert and condition the signal.

Figure 12A:
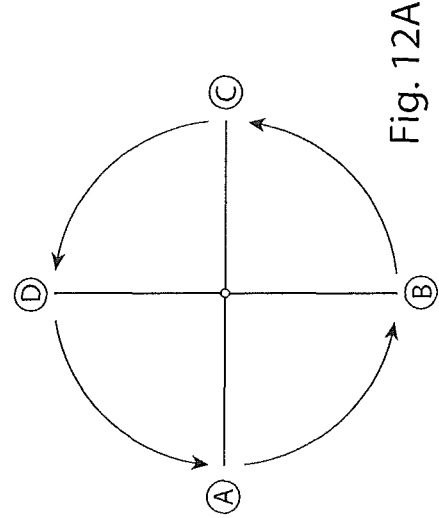
FIG. 12A is a diagram depicting positions of a crank arm during rotation.
Figure 12B:
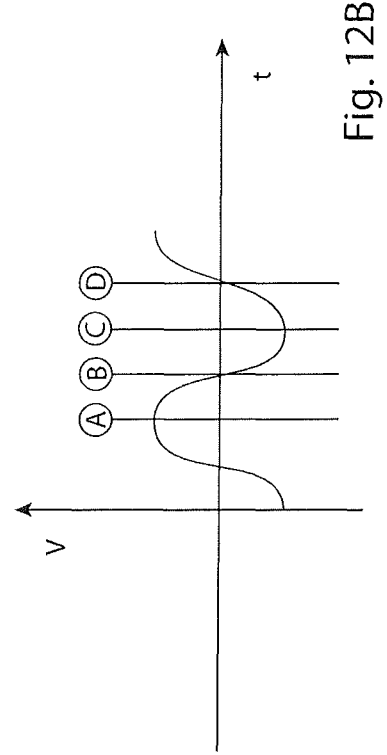
FIG. 12B illustrates an output voltage waveform of the Wheatstone bridge circuit of FIG. 11 for approximately one revolution the crank arm depicted in FIG. 12A.
Figure 13:
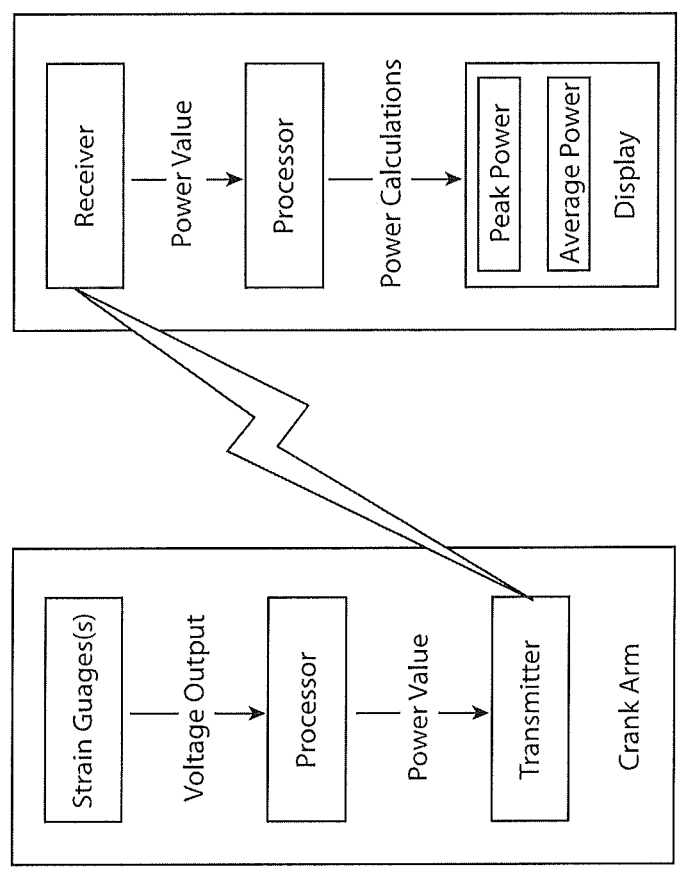
FIG. 13 is system diagram illustrating the electrical components positioned at the crank arm and within the power measurement housing in wireless communication with a display computer provided separately from the power measurement apparatus.

With the illustrated strain gauge configuration, the output voltage of the Wheatstone bridge circuit is proportional to the torque applied and also indicative of the direction of rotation and the crank position. As illustrated in FIGS. 12A and 12B, generally speaking, the output of the Wheatstone bridge will be a sinusoid with the highest output voltage with the crank approximately horizontal and a downward force applied to the crank arm (crank position A, FIG. 12B). As the crank moves through the downward vertical position (crank position B), the voltage will typically be about 0, as the crank moves upward to horizontal (crank position C) the voltage will be slightly negative. Typically the downward force of the opposing crank arm pushes the measured arm up against some weight of the rider's leg (typically riders do not pull upward on the cranks, the opposing leg hence uses some force to push the opposing crank arm upward against the opposing leg), and as the crank moves through the upward vertical position (crank position D) the output voltage will transition from a negative value to a positive value, and reach its peak output again as the crank is rotated through horizontal (crank position A).

In one possible implementation of the power measurement device 10, power measurement only occurs on one of two crank arms. In such an arrangement, relative symmetry between the right and left leg of a given rider is assumed and the average power calculated from the power measurement device on one crank is doubled and transmitted to the display processor. In one example, the power doubling occurs within the power measurement device, by the processor or otherwise, and the power value wirelessly transmitted by the device includes the doubling. With such an arrangement, the power measurement device may work with a proprietary display device or may work with third party devices that implicitly expect a value that accounts for both legs and has no inherent functionality to double a value. In some examples, the device may wireless transmit the single leg (crank) power value and doubling may occur at the display processor or related display electronics. Alternatively, the display may be configured to sum to power values wireless received, when separate power measurement devices are each mounted on opposing crank arms to provide distinct crank arm power measurements.

Regardless, the power calculations/measurements displayed are indicative of the total power output by a given rider. Measuring power of only one leg, while theoretically not as precise as separate devices for each leg, nonetheless has several advantages. First, retrofitting and maintaining the power measurement device is far less complicated and costly compared to a similar implementation with two devices. Secondly, when installed on training equipment, particularly in a gym environment where a given rider may not use the same equipment during successive trips to the gym, the device set out herein may be calibrated such that power measurements across machines is consistent. With such consistency, whether across machines or not, a given rider can measure overall relative riding differences. Of course, it is possible to apply a power measurement device to each crank arm of a given machine and provide individual crank arm power measurements as well as a summation of the power measurements. In such an implementation, a rider would be provided with data on each individual leg as well as a total power output indicative of overall power output.

A reed switch 40 is included in the power measurement device and a magnet (not shown) may be placed on the frame of whatever device the crank is attached to such that the reed switch closes as it passes the magnet. Thus, the time between two pulses of the reed switch indicate one complete revolution of the crank. Using a microprocessor clock, the pulses can be converted to a revolution per minute measurement.

Figure 14:
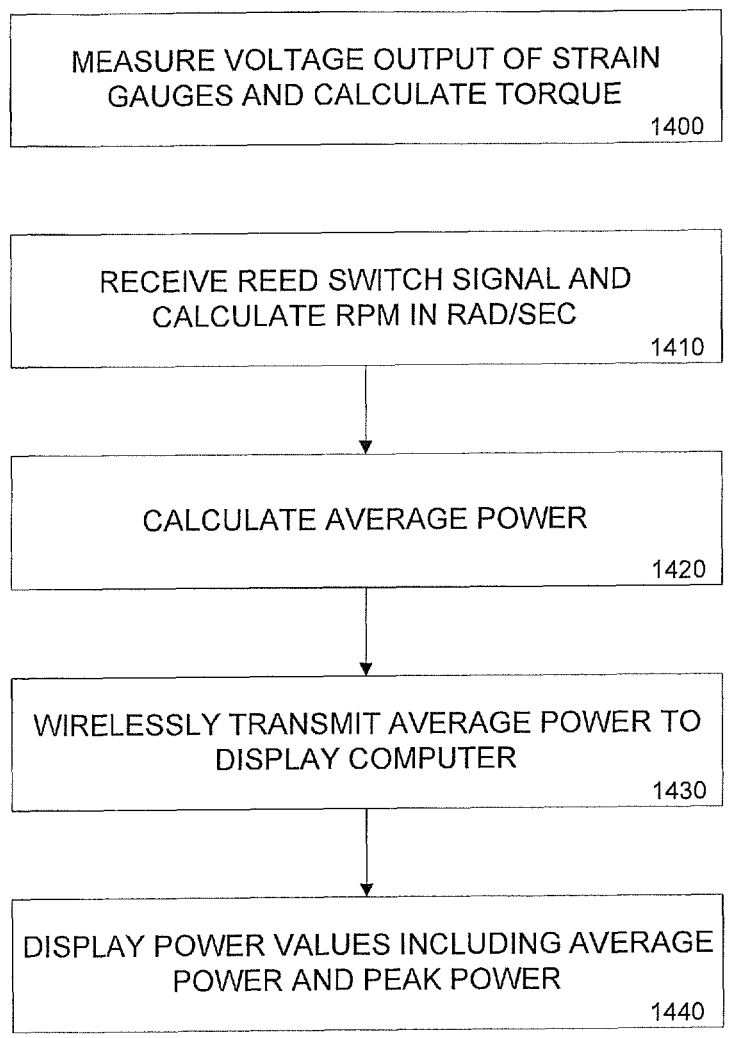
FIG. 14 is a flowchart illustrating one method of calculating and transmitting power measurements from the power measurement apparatus.

"Power" is the most common measurement of a rider's strength. Referring to FIG. 14, in one implementation, the instantaneous torque 15 measured by the strain gauges with the output voltage of the strain gauges being, is converted to a power value for display. First, the voltage output of the strain gauges is provided to the processor (operation 1400). The output of the circuit is a measure of torque and therefore is converted to power through obtaining a radians/sec value. As mentioned herein, the voltage output may first be converted to a digital value through an analog to digital converter. In on specific implementation, power (watts) is calculated as radians/sec multiplied by the torque value.

$$\text{Power(Watts)} = \text{Radians/Sec} \times \text{Torque}. \tag{1}$$

The reed switch and/or the accelerometer provide data indicative of each revolution of the crank arms. In conjunction with the processor clock, or otherwise, the processor obtains a revolutions per minute value in radians per second (operation 1410). With a reed switch, a pulse is received at each revolution of the crank arm, and the pulses are converted to revolutions per minute through comparison with the processor clock. Then, to convert the RPM value to Radians/Sec, a multiplier value of 0.1047 is used, in one particular example.

$$\text{RPM} \times 0.1047 = \text{Rad/Sec}. \tag{2}$$

The strain gauge measurement, in conjunction with the revolution measurements, is converted to an instantaneous power value by as discussed above and multiplying that value by the length of the crank arm between the apertures (operation 1420).

$$\text{Torque}(N^*m) = \text{Force(Newton)} \times \text{Length(meters)}. \tag{3}$$

Hence, with measured torque multiplied by the Rad/Sec value, power is calculated. In one example, power is sampled at 32 Hz, and converted and wirelessly transmitted (operation 1430) to the display using the ANT+ protocol developed by Dynastream Innovations, Inc. While the transmitter is shown as a discrete component within the housing, it is possible that it, along with other electrical components, might be provided in the processor. Further, the processor may be implemented as an ASIC, as computer executable instructions in a memory attached to the processor, as a customized circuit, etc. Moreover, other protocols and wireless transmission mechanism may be employed.

In one possible implementation, the average power is displayed (operation 1440) over a number of samples as opposed to an average across all samples. In this way, large changes in power associated with rapid acceleration, for example, may be captured but rapidly changing fluctuations between power measurements are filtered by the averaging. In one example, a rolling average of the most recent 64 measurements is displayed. Hence, the most recent 64 power measurements are summed and divided by 64 to display average power. Note, the power measurement device transmits instantaneous power measurements at 32 Hz and those measurements are doubled (to account for the opposing crank without a power measurement device). While this combination of transmission frequency and averaging is not necessary, it has been shown to be responsive to instantaneous changes associated with quick acceleration as well as providing a display that is not overly jittery if too few values are averaged. It is also possible to transmit torque values (or voltages) and RPM measurements, and then calculate power within the display counsel.

Returning again to the figures illustrating the housing 14 (e.g., FIGS. 1, 2, and 4) adjacent the mounted portion 26 is a cantilevered portion of the housing. The cantilevered portion 26 extends from the mounted portion 24 along the crank arm body toward the pedal aperture 22. The cantilevered portion 26 houses batteries 58 and connection points to provide power to the electrical components within the mounted portion of the housing. The cantilevered portion defines a substantially flat bottom adjacent, but not touching, the inside portion of the crank arm. Because the crank arm does bend during usage albeit only slightly, cantilevering a portion of the housing provides several advantages. Firstly, by not touching the crank arm, there will not be any squeaks caused by the crank arm moving relative to and rubbing against the cantilevered portion. Secondly, the cantilevered portion is not bolted to the crank arm. Had the cantilevered portion been bolted, the bending distance between the bolts on the mounted portion relative to a bolt on the cantilevered portion could potentially cause the housing to crack, to loosen the bolts, or to damage some internal components.

The cantilevered portion 26 includes a base portion 62 that extends from and is integral to the mounted portion. The base portion 62 includes opposing side walls 64 and a front wall 56 distal a midwall 68 of the mounted portion. Battery contact points 60 are provided at the front wall and the midwall and batteries are positioned therebetween. Wires are connected to the contact points and routed to the circuit board to provide power to the various components coupled thereto. A cover 70 is snap fit to the base portion and may further be secured by a small screw 72 engaging a threaded aperture in the front wall. The embodiment shown includes two AA batteries, which are well suited for a club environment for ease of exchange and long life. It is also possible to use smaller watch style (coin) batteries or other types of power supply.

In an alternative implementation, an accelerometer, which may be a two or three axis accelerometer, may be used alone or in conjunction with the reed switch. An accelerometer may be used to provide both crank position and rpm measurements. Namely, for example, in a two axis accelerometer or a three axis accelerator where two of the three axes are used, one axis may be aligned with the crank arm and the other axis oriented at 90 degrees to the crank arm. Accordingly, one axis will output a value commensurate with the g-force experienced by the crank and the other axis will output a value 90 degrees out of phase with the first. By knowing the axis associated with the crank and whether attached to the left or right crank, the accelerometer, will output a value that is a function of the crank position among other factors. Further by comparing the output of the other axis, it can be determined whether the cranks are being pedaled forward or backward.

In another alternative implementation, a thermistor is operably associated with the processor. Strain gauges, the crank material, and other components are affected by temperature. Accordingly, it is possible that when a power assembly is exposed to significant temperature variations, such as during a ride that commences early in the morning and continues as the outside temperature increases, the power output delivered by the device would vary based on temperature. In such situations, the device may output different power values due to temperature even when the rider is cranking at the same power. So, a rider cranking along at 150 watts in the early morning would have a power reading of 150 watts, and the same rider cranking along at 150 watts after it has warmed up outside may only have a power reading of 100 watts. The thermistor can be used to provide temperature compensation to the power value and thereby reduce or eliminate the temperature effect on the power calculation.

In one particular implementation, the Wheatstone bridge circuit provides its voltage output to an analog-to-digital converter to convert the voltage to a digital value. The thermistor also outputs its voltage to the analog-to-digital converter to convert the voltage to a digital value. These values are then input to the processor. Therefore, the processor receives a digital power value and a digital temperature value.

The processor, which is coupled with a memory and/or includes on-board memory, has a power curve and may also have a temperature curve (for those embodiments including a thermistor). Each curve may be established by measuring the output of the A-to-D converter at two known values (e.g., two known forces on the pedal or two known temperatures). Since the curves are typically straight line curves, two values are sufficient to determine the slope of the curve. For the power curve, an A-to-D value is compared with the power curve to determine the power being applied to the crank. To compensate for temperature, the A-to-D value of the thermistor is used to select a temperature offset value (or compensation value) from the temperature curve to apply to the power value.

Power measurement devices, in accordance with this disclosure and otherwise, may benefit from calibration. For example, initial and/or periodic calibration may be helpful in order to accurately and/or consistently measure a rider's power output. Such calibration may be beneficial for various reasons including drift or other variation that may be caused by, among other things, general wear, environmental conditions, deformation of sensors or other components, or other conditions and changes over the useful life of the power measurement device. Such calibration is preferably conducted quickly and with minimal intervention by the user. Accordingly, in a further aspect of the present disclosure, systems and methods for calibrating a power measurement device are provided.

Power measurement device calibration systems and methods in accordance with the present disclosure generally rely on measuring the angle of a crank arm on which the power measurement device is mounted. The angular orientation of the crank arm is then used to determine a predicted force reading based on known characteristics of the crank arm and pedal assembly. The predicted force is then compared to a force reading obtained from a strain gauge or similar sensor of the power measurement device. The difference between the predicted and measured forces provides an offset which is subsequently used to "zero" the power measurement device and recue or eliminate bias that may have been introduced into the power measurement device.

Figure 15:
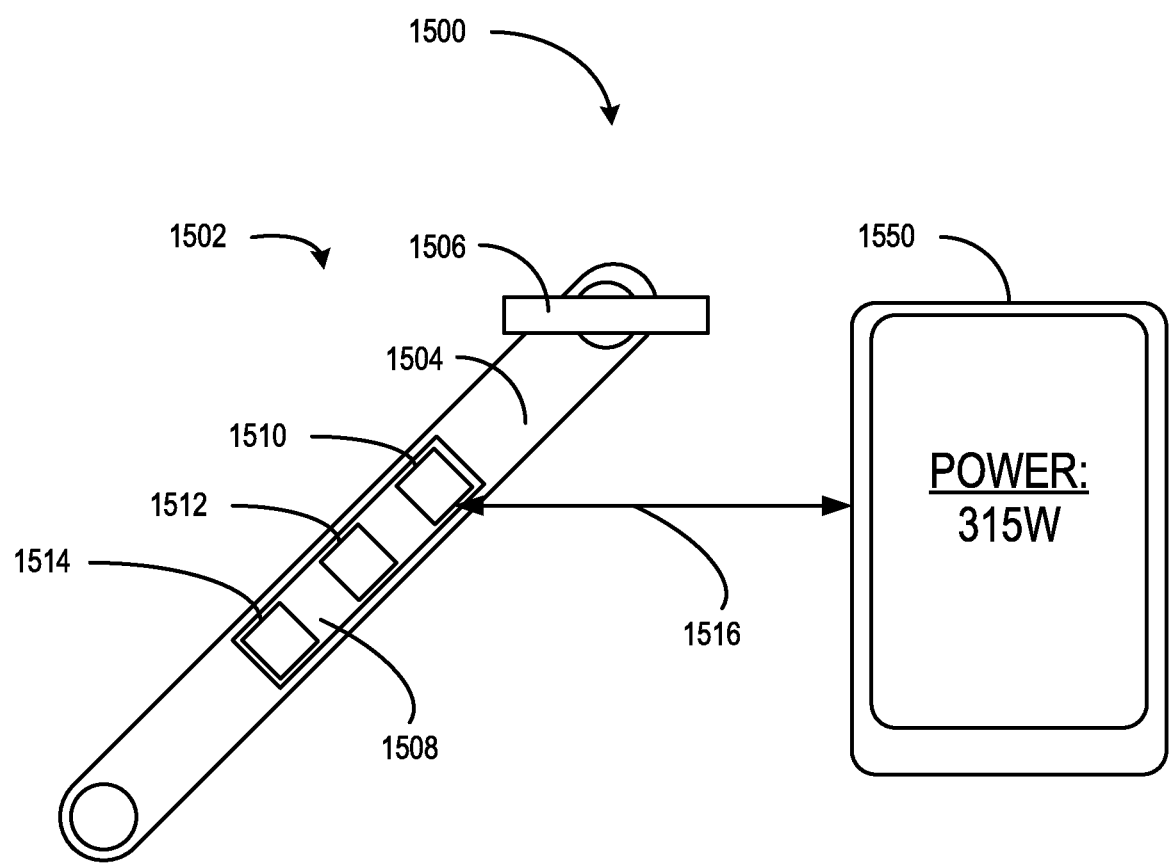
FIG. 15 is a schematic illustration of a power measurement system in accordance with the present disclosure.

FIG. 15 is a schematic illustration of an example power measurement system 1500. The power measurement system 1500 includes a crank assembly 1502 including a crank arm 1504 to which a pedal 1506 may be coupled. The crank assembly 1502 further includes a power measurement assembly 1508 that includes each of a processing device 1510, a first sensor 1512 for measuring forces applied on the crank arm 1504 (e.g., one or more strain gauges), and a second sensor 1514 for measuring an angular position of the crank arm 1504. The processing device 1510 is communicatively coupled to each of the first sensor 1512 and the second sensor 1514 such that the processing device 1510 is capable of receiving and processing measurements from the first sensor 1512 and the second sensor 1514. Moreover, while not illustrated in FIG. 15, the power measurement assembly 1508 may further include, among other things, one or more of an analog-to-digital converter, a filter, an amplifier, and various other electronic components for processing and conditioning signals received from the first sensor 1512 and the second sensor 1514. The processing device 1510 may also include or be coupled to one or more memory devices for storing, among other things, instructions executable by the processing device 1510, data obtained by the processing device 1510, and data for use by the processing device 1510.

In certain implementations, the processing device 1510 may be paired or otherwise communicatively coupled to a computing device 1550. Such a computing device may include, without limitation, one or more of a cycling head unit, a stationary bike console, a laptop, a desktop computer, a smartphone, or a tablet. Communication between the processing device 1510 and the computing device 1550 may occur over a direct (e.g., wired) or a wireless connection and may be conducted using any suitable communications protocol (e.g., Bluetooth, Bluetooth Low Energy, ANT, and ANT+). In general, the computing device 1550 may be configured to receive measurements from the processing device 1510 and to display corresponding power measurements in a suitable format to a rider. Measurements may include angle and force measurements (or signals corresponding to such measurements) provided by the sensors of the power measurement assembly 1508 or may include values derived from such measurements by the power measurement assembly 1508. The computing device 1550 may also be used to interact with the power measurement assembly 1508 and, more particularly, the processing device 1510 such that the rider may, among other things, obtain historical data stored by the power measurement assembly 1508, and calibrate the power measurement assembly 1508.

As noted above, the first sensor 1512 is generally used to measure forces on the crank arm 1504. Accordingly, in certain implementations, the first sensor 1512 is a strain gauge. As also noted above, the second sensor 1514 is generally used to measure the angular orientation of the crank arm 1504. In certain implementations, for example, the second sensor 1514 is an accelerometer. In other implementations, however, the second sensor 1514 may be, among other things, a potentiometer, a rotary encoder, or any other suitable sensor that may be used to determine the angular orientation of the crank arm 1504. While illustrated as being disposed in an intermediate location along the crank arm 1504, the second sensor 1514 may instead be incorporated into the coupling between the crank arm 1504 and the crankset spindle based on the type of sensor implemented. For purposes of the following examples and for simplicity only, the first sensor 1512 is referred to herein as a strain gauge 1512 and the second sensor 1514 is referred to herein as an accelerometer 1514. Accordingly, the following discussion should not be seen as limiting the first sensor 1512 to a strain gauge and the second sensor 1514 to an accelerometer, but is rather intended only to be illustrative of one embodiment in accordance with this disclosure.

Figure 16:
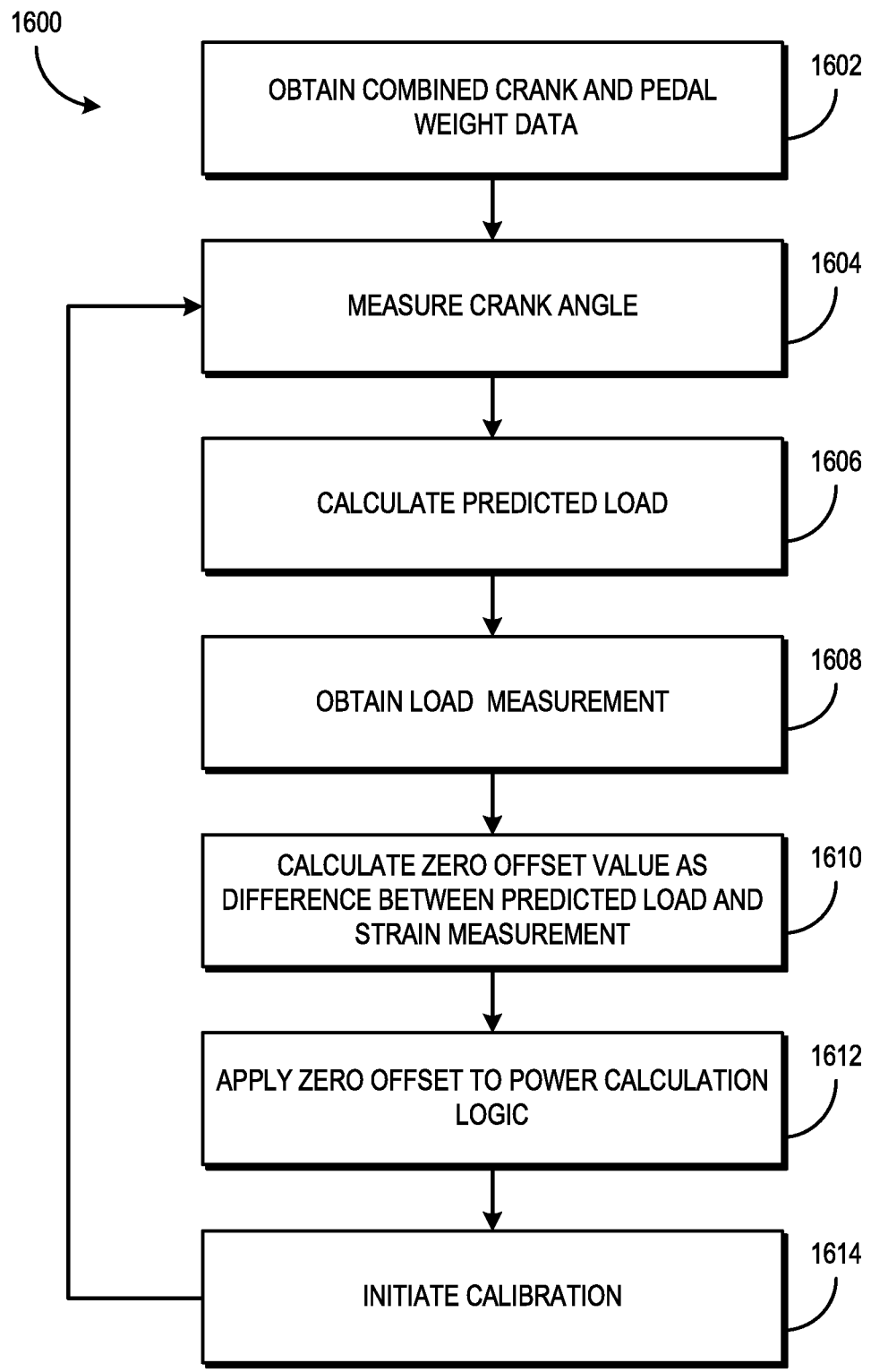
FIG. 16 is a flow chart illustrating a method of calibrating the power measurement system of FIG. 15.

FIG. 16 is a flow chart illustrating a method 1600 of calibrating a power measurement device in accordance with the present disclosure. In discussing the method 1600, reference is also made to the power measurement system 1500 of FIG. 15. In general, the method 1600 includes first obtaining weight data for the crank arm assembly 1502. Subsequent to obtaining the weight data, a zero offset may be determined by measuring the current force on the crank arm 1504 (e.g., by using the strain gauge 1512 of the crank arm assembly 1502) and subtracting from the measured value a predicted force based on the current angle of the crank arm 1504 and the weight data. The difference between the measured force and the predicted force is then used as a zero offset for subsequently measured forces. This general process is described below in further detail.

Throughout the following discussion, loading of the crank arm 1504 is described in terms of both a force applied to or otherwise experienced by the crank arm 1504 and a strain resulting from such forces and generally expressed as a strain gauge measurement. For purposes of the following discussion, it is assumed that the relationship between force and strain is governed by the general equation relating force and strain for a beam, as provided in equation (4):

$$\varepsilon = (Mc)/(IE) = (Fdc)/(IE) \quad (4)$$

where ε is the strain, M is the moment resulting from the applied force F at distance d, c is the distance from the center of the crank arm to its outer surface, I is the moment of inertia based on the crank arm geometry, and E is the modulus of elasticity of the material from which the crank arm is made. Notably, each of I, E, c, and d are constant for a given crank arm and may be stored in memory of the processing device 1510 such that either of c and F can be calculated given the other. To further facilitate conversion between strain gauge measurements and force, it is further assumed that the relationship between strain gauge measurements (which may be expressed as a voltage) and actual strain is known and also stored in memory of the processing device 1510.

At operation 1602, combined crank arm and pedal weight data is obtained. As described below in further detail, the combined crank arm and pedal weight data is used to calculate a predicted load on the crank arm 1504 based on its current angle. The combined crank arm and pedal weight data may be obtained in various ways including, without limitation, one or more of obtaining the combined crank arm and pedal weight data from a data source, such as a website or application; manually inputting the combined crank arm and pedal weight data; or performing an auto-detection routine to determine the combined crank arm and pedal weight data.

Although the combined crank arm and pedal weight data may simply be the actual, measured weight of the crank and pedal, the term "combined crank arm and pedal weight data" as used herein may also include values of electrical signals, such as strain gauge measurements, that correspond to the combined crank arm and pedal weight. So, for example, the combined crank arm and pedal weight data may be a table of strain gauge measurements obtained at various angles with the crank arm and pedal unloaded. While such a table may not include the combined crank arm and pedal weight in terms of mass, it would nevertheless indicate the effect of the combined crank arm and pedal weight on measurements obtained from the strain gauge.

It should also be noted that the combined crank arm and pedal weight described herein will generally be the load on the crank arm resulting from gravitational force acting on the crank arm and pedal alone. Nevertheless, in certain implementations, the combined crank arm and pedal weight data may also include the weight of one or more additional components and/or may include one or more forces applied to the crank arm assembly 1502. Accordingly, while the term "crank arm and pedal weight data" is used herein to generally refer to the weight of the crank and pedal due to gravity (or an electrical signal/strain measurement corresponding thereto), the term should be interpreted to more broadly refer to the base load on the crank arm 1504.

As previously noted, in certain implementations, the combined crank arm and pedal weight may be retrieved from a remote data source using, among other things, a website or a mobile application. In such implementations, a rider may use the computing device 1550 to navigate to or otherwise access the remote data source, provide information regarding their particular crank and pedal model, and, in response, receive corresponding combined crank arm and pedal weight data. Such data may then be stored within the computing device 1550. The combined crank arm and pedal weight data may also be transmitted to and stored within the processing device 1510. In other implementations, the computing device 1550 may also allow a user to manually input the combined crank arm and pedal weight data. Again, this data may be stored within the computing device 1550 and/or transmitted and stored within the processing device 1510.

The combined crank arm and pedal weight data may also be obtained through an auto-detection process. For example, the computing device 1550 may direct a rider to position the crank arm 1504 in one or more angular positions and may record the resulting readings of the strain gauge 1512 in order to generate a table correlating angular positions of the crank arm 1504 to outputs of the strain gauge 1512. It should be appreciated that the terms "angular position", "angular orientation" and "angle" as used to describe the crank arm generally refer to the angle of the crank arm 1504 about a spindle on which the crank arm 1504 is mounted. Also, while zero degrees is illustrated in the various implementations herein as being defined in a horizontal direction, zero degrees may alternatively be defined according to an alternative frame of reference. For example and without limitation, zero degrees may be defined as the crank arm 1504 being vertically upward, vertically downward, or horizontally backward.

Figure 17B:
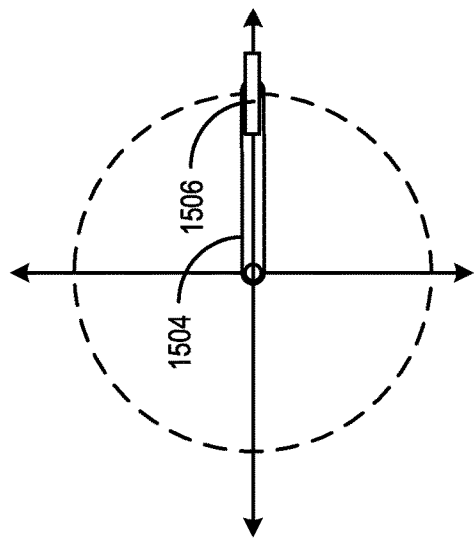
FIGS. 17A-17D are schematic illustrations of a crank arm and pedal of the power measurement system of FIG. 15 illustrating different angular orientations of the crank arm during auto-detection of a combined crank arm and pedal weight.
Figure 17D:
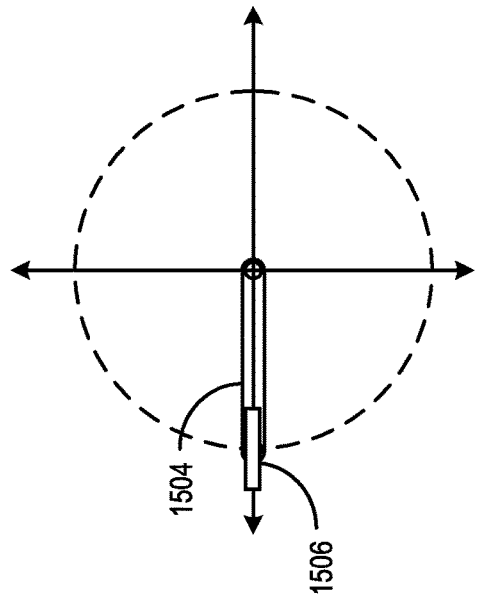
Figure 17A:
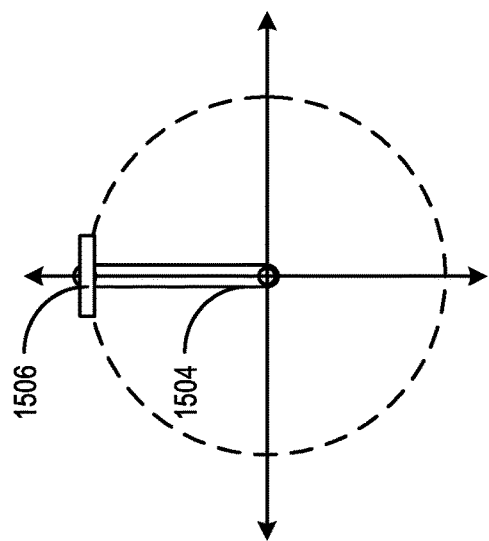
Figure 17C:
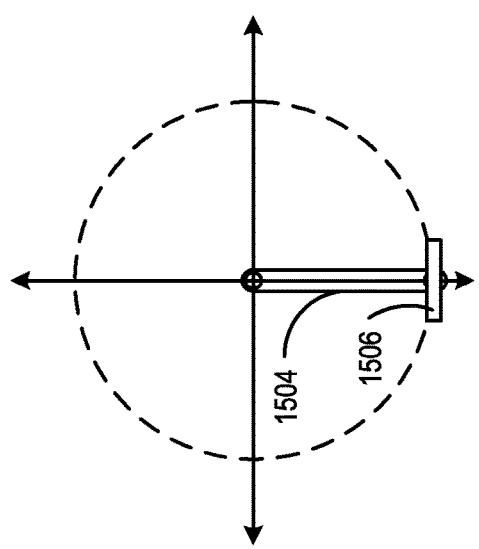

In an example auto-detection process, the rider may be directed to position the crank arm 1504 in each of the positions illustrated in FIGS. 17A-D. In FIG. 17A, the crank arm 1504 is in a vertical or 12 o'clock orientation and, as a result, the strain gauge 1512, which generally measures strain in a direction perpendicular to the length of the crank arm 1504, should produce a minimum output. When oriented in a horizontal or 3 o'clock position, as in FIG. 17B, the weight of the crank arm 1504 and the pedal 1506 produce maximum strain and, as a result, a maximum reading on the strain gauge. Similarly, the 6 o'clock and 9 o'clock position illustrated in FIGS. 17C and 17D also result in a second minimum reading and a negative maximum reading, respectively. Accordingly, after conducting the example auto-detection process, four readings taken at 0, 90, 180, and 270 degrees may be obtained and stored within a table or similar data structure for future reference.

In certain implementations, a feedback mechanism may be provided to facilitate positioning of the crank arm 1504 in the positions required for the auto-detection process. For example, the computing device 1550 may provide visual and/or auditory feedback to indicate whether the crank arm 1504 is properly oriented to obtain measurements of the combined crank arm and pedal weight. Although other feedback mechanisms may be implemented, in one specific example the computing device 1550 may present a visualization of the crank arm and pedal similar to those of FIGS. 17A-D that updates to show the current position of the crank arm 1504. The visualizations may include colored regions or similar indicators delineated where the crank arm 1504 is to be positioned for purposes of calibration. In other implementations, the computing device 1550 may display a message, play a sound, or otherwise provide some indication to the rider when the crank arm 1504 is properly positioned.

Although the 0, 90, 180, and 270 degree pedal positions may be particularly useful because they provide the maximum and minimum strain on the crank arm 1504, these positions are not necessarily required for implementations of the current disclosure. Rather, as described below in further detail, the angle measurement and corresponding strain gauge measurements collected during the auto-detection process provide points from which strain gauge measurements may be interpolated or extrapolated for angle measurements other than those captured during the auto-detection process. Accordingly, deviations from 0, 90, 180, and 270 degrees are generally sufficient to interpolate or extrapolate as described below. It should also be appreciated that more accurate interpolation and extrapolation may be achieved by capturing strain gauge measurements at additional angular positions. For example, in the preceding example additional measurements may be captured at 45, 135, 225 and 315 degrees or similar intermediate locations.

As described above, the auto-detection process may generally include a user/rider manually moving the crank arm 1504 into various angular positions in which strain gauge measurements are obtained. In certain implementations, at least some of the angle/strain pairings may instead be obtained without such user intervention. For example, in response to detecting a given condition (e.g., inactivity for a period of time, the power meter entering or exiting a "sleep" mode, etc.), each of the current angle of the crank arm 1504 and the strain on the crank arm 1504 may be obtained and stored. Such pairings may be collected over time as the sole source of the combined crank and pedal weight data. Alternatively, such pairings may be used to supplement other combined crank and pedal weight data, such as that obtained using the previously described method in which the user repositions the crank arm 1504 between strain measurements. In either case, collecting additional angle and shear measurement pairings over time may facilitate the interpolation and extrapolation process when predicting loads on the crank arm 1504 as described below in more detail in the context of operation 1606.

The combined crank arm and pedal weight data may be stored in different forms. For example, in the case where the combined crank arm and pedal weight data is downloaded or manually input, the combined crank and pedal weight data may be stored as a weight. On the other hand, if the foregoing auto-detection process is used, the combined crank arm and pedal weight data may be stored as a table of angles and corresponding strain measurements obtained from the strain gauge 1512 of the crank assembly 1502.

Referring back to the method 1600, after obtaining the combined crank arm and pedal weight data, the current crank arm angle is measured (operation 1604). In general, the current angle of the crank arm 1504 dictates the degree to which the combined crank and pedal weight contributes to the load on the crank arm 1504. More specifically, the angle of the crank arm dictates the length of the moment arm between the spindle and the center of mass of the crank arm assembly 1502 and, as a result, the amount of any measured load on the crank arm 1504 attributable to the weight of the crank arm assembly 1502.

In one example implementation, the crank angle may be determined by obtaining one or more readings from the accelerometer 1514. If the accelerometer 1514 is an angular accelerometer, the angle of the crank arm 1504 may be determined by, among other things, twice integrating the readings from the accelerometer 1514. Alternatively, if the accelerometer 1514 is a linear accelerometer, the angular acceleration may be calculated according to equation (5):

$$\alpha = a/r \quad (5)$$

where $\alpha$ is the angular acceleration, a is the linear acceleration, and r is the radius at which the accelerometer is disposed relative to the spindle on which the crank arm 1504 is mounted and about which the crank arm 1504 rotates. The angular acceleration may then be twice integrated to determine the angular position of the crank arm 1504.

The foregoing approaches to determining the angular orientation of the crank arm 1504 are intended merely as examples and should not be seen as limiting. Rather, the angular orientation of the crank arm 1504 may be obtained using any suitable sensor and corresponding mathematical transformations to convert a signal from the sensor to a meaningful value representative of the angular orientation of the crank arm 1504.

Once the current angle of the crank arm 1504 is determined, a predicted load on the crank arm 1504 is calculated (operation 1606). The predicted load is generally an expected load on the crank arm 1504 attributable to the combined crank and pedal weight based on the previously obtained crank arm and pedal weight data. In other words, the predicted load is the load that ought to be measured at the current angle based on the known or measured weight of the crank arm and pedal. As used herein, the term "predicted load" is broadly used to describe loads expressed as both force values (e.g., in pounds (lbs) or Newtons) and as corresponding electrical signals, such as strain gauge measurement.

Figure 18:
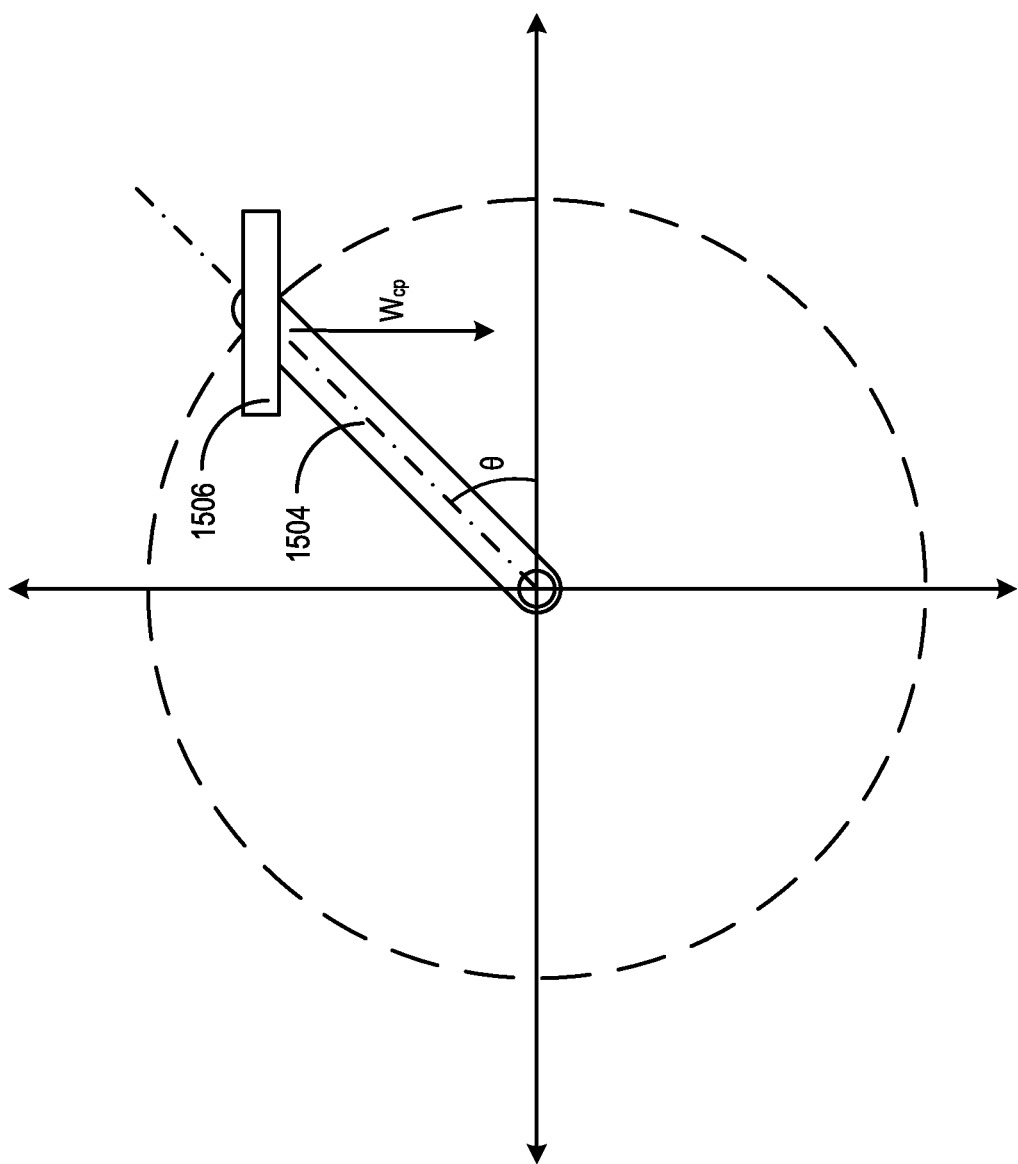
FIG. 18 is a schematic illustration of the crank arm and pedal of FIG. 15.

The process by which the predicted load is calculated may vary depending on the nature of the combined crank and pedal weight data. In implementations in which the combined crank and pedal weight data is in the form of a stored weight (e.g., as retrieved from a website or manually input by a user), the predicted force may be calculated by equation (6):

$$F_P = W_{CP} * \cos(\theta) \quad (6)$$

where $F_P$ is the predicted force measurement provided by the strain gauge, $W_{CP}$ is the combined weight of the crank and pedal, and $\theta$ is the current angle of the crank arm 1504. These parameters are illustrated in FIG. 18, which is a schematic illustration of the crank arm 1504 and pedal 1506 oriented at the angle $\theta$.

In implementations in which the combined crank and pedal weight data is stored as a table or similar data structure of angle and strain gauge measurements (e.g., as obtained using the previously described auto-detection process), the predicted force may instead be calculated by extrapolating or interpolating based on the stored data to determine a predicted strain gauge measurement. For example, if the table includes a strain gauge measurement for each of 0 degrees and 90 degrees but the current angle of the crank arm is 60 degrees, a predicted strain measurement may be obtained by performing a linear interpolation between the strain gauge measurements obtained for 0 and 90 degrees according to equation (7):

$$S_\theta = S_0 + (\cos(\theta) - \cos(\theta_0))(S_1 - S_0)/(\cos(\theta_1) - \cos(\theta_1)) \quad (7)$$

where $S_\theta$ is the predicted strain gauge measurement, $\theta$ is the current angle of the crank arm (60 degrees in the current example), $S_0$ is the strain gauge measurement obtained at a first angle $\theta_0$ (0 degrees in the current example), and $S_1$ is the strain gauge measurement obtained at a second angle $\theta_1$ (90 degrees in the current example).

Equation 7 may also be used to perform a linear extrapolation to predict $S_\theta$ when the current angle ($\theta$) lies outside two angles for which strain measurements are available. For example, equation (7) may be used to extrapolate $S_\theta$ if the current angle ($\theta$) is 60 degrees and strain measurements are available for a first angle ($\theta_0$) of 0 degrees and a second angle ($\theta_1$) of 45 degrees.

The linear interpolation/extrapolation equation above is provided merely as an example of an interpolation and extrapolation technique that may be applied to the strain gauge measurements obtained during the auto-detection process to obtain predicted strain gauge measurements. In other implementations other interpolation/extrapolation methods, such as but not limited to polynomial interpolation/extrapolation.

Once the predicted load on the crank arm is calculated, the predicted load is compared to an actual measured load at the current crank arm angle to determine if there is any deviation between the two values. In other words, a comparison of what the load ought to be at the current angle (i.e., the predicted load) is compared to the actual strain measure load to identify any discrepancies. To do so, the actual load on the crank arm is first obtained from the strain gauge 1512 (operation 1608). Subsequently, the difference between the predicted and the actual load is calculated to calculate a zero offset value (operation 1610).

The zero offset value obtained in operation 1610 captures any drift, deviation, inconsistency, or change that may have affected the power meter over time. As a result, the zero offset value may be incorporated into power calculation logic to account for such issues. For example, the zero offset value may be stored or used to update a zero offset used in power calculation logic executable by the processing device 1510 to determine power output (operation 1612).

After an initial calibration, subsequent calibration processes may be initiated (operation 1614) to recalibrate the power measurement device 1500. Such initiation may occur in various ways including in response to a command or input provided by a rider or under various conditions or in response to various events. For example, in certain implementations, a rider may manually initiate calibration of the power measurement device 1500 by, among other things, providing a command or input to the power measurement device 1500 using the computing device 1550. Alternatively, the rider may perform a predetermined action, such as backpedaling the crank arm 1504 a number of times, to initiate calibration.

In other implementations, calibration may be initiated automatically. For example, calibration may occur automatically upon startup/initiation of the computing device 1550, upon "waking" of the power measurement device 1500 by movement of the crank arm 1504, or upon the computing device 1550 connecting to the power measurement device 1500. Alternatively and among other things, calibration may occur on shutdown of the computing device 1550, in response to disconnection of the computing device 1550 from the power measurement device 1500, prior to the power measurement device 1500 entering a "sleep" mode in response to a period of low activity or inactivity as measured by the sensors of the power measurement device 1500, or upon measuring a certain amount of inactivity (e.g., as measured by loading and/or movement below a threshold for a particular time period). In either case, initiation of the calibration routine may be preconditioned on various factors to avoid producing an erroneous zero offset. For example, the power measurement device 1500 may not initiate calibration if a load is measured that exceeds a load threshold corresponding to a maximum expected weight of a crank and pedal. Similarly, the power measurement device 1500 may not initiate calibration unless movement of the crank arm 1504 is below a movement threshold, the movement threshold being some maximum displacement, speed, acceleration, or other movement metric that may be used to determine if the crank arm 1504 is stationary. A time element may also be considered such that any measured load or movement must be below a particular load or movement threshold, respectively, for an amount of time greater than or equal to a time threshold (e.g., five seconds, ten seconds, fifteen seconds, etc.) before calibration may begin. Calibration may also be precluded based on measurements obtained from the accelerometer 1514. For example, the accelerometer 1514 may be used to determine whether the orientation of the crank arm 1504 indicates that the bicycle or exercise equipment to which the crank arm 1504 is coupled is set down on the ground or otherwise in a position in which the crank arm 1504 is not oriented in a substantially vertical plane.

In embodiments of the present disclosure, force calculations and application of the zero offset value may be conducted by different components. Generation of a force value generally includes the conversion of an output generated by the first sensor 1512 into a digital signal within a known range. The digital signal may in turn be converted to a known force value by applying one or more logical operations. For purposes of this disclosure, the "power calculation logic" referred to in operation 1612 may include any or all operations between measuring an output of the first sensor 1512 and display of a power measurement based on the output to a rider. The initial conversion of the output of the first sensor 1512 to the digital signal may include, among other things, analog-to-digital conversion, amplification, filtering, sampling, and other processes being applied to a signal generated by the first sensor 1512. Conversion from the digital signal to an actual force value may be conducted by either of the processing device 1510 and the computing device 1550. For example, in certain implementations, the processing device 1510 may receive the digital signal and apply one or more mathematical operations to convert the digital signal to a force value. The force value may then be transmitted to the computing device 1550 in order to calculate and display a power measurement. In other implementations, the digital signal may be sent from the processing device 1510 to the computing device 1550 and the computing device 1550 may perform the steps of calculating the actual force and converting the actual force to a power output.

The zero offset calculated using systems and methods in accordance with this disclosure may be applied at various points in converting the signal from the first sensor 1512 to a power output. Accordingly, the zero offset may take the form of, among other things, one of an analog voltage value, a digital voltage value, and a numerical force value. For example, in certain implementations, the zero offset may be an analog voltage value applied directly to the output of the first sensor 1512 or during the process of converting the output of the first sensor 1512 to a digital signal. In other implementations, the zero offset may be a digital value applied to the digital signal prior to converting the digital signal to a corresponding force value. In still other implementations, the zero offset may be a numerical force value that is applied to the force value generated from the digital signal.

Regardless of where the zero offset value is applied, the zero offset value is generally added to force signals or measurements provided by the first sensor 1512 (i.e., the sensor for measuring load on the crank arm 1504). For example, in one implementation, the zero offset value may be expressed as a +0.1 mV such that each voltage measurement obtained from the first sensor is considered to be 0.1 mV greater when being converted to a force value. Similarly, the zero offset value may instead be expressed as a −0.25 N force such that all force measurements form the first sensor 1512 are reduced by 0.25 N when calculating power.

In accordance with the foregoing, the term "force measurement" (and similar related terms), as used herein, is intended to include each of measurements in units of force (e.g., pounds or Newtons) but also electrical signals representative of a force applied to an object, such as the crank arm 1504. For example, unless otherwise specified, a force measurement may include any of an analog signal, a digital signal, and a numerical value that is generated in response to a force being applied. Similarly, the term "angular measurement" (and similar related terms), as used herein, is intended to include each of measurements in angular units (e.g., radians or degrees), but also electrical signals representative of an angular orientation of an object, such as the crank arm 1504. For example, unless otherwise specified, an angular measurement may include any of an analog signal, a digital signal, and a numerical value that is representative of an angular orientation.

It should also be appreciated that while the foregoing examples provided in the current disclosure refer to "combined crank arm and pedal weight data", the calibration systems and methods disclosed herein may also be applied to a crank arm only. For example, the processes of obtaining load information for a range of angular orientations of the crank arm, using such data to predict a load on the crank arm, and then calculating an offset value by measuring a difference between the predicted load and a measured load may be conducted without a pedal mounted on the crank arm.

Although various representative embodiments of this disclosure have been described above with a certain degree of particularity, those skilled in the art could make numerous alterations to the disclosed embodiments without departing from the spirit or scope of the inventive subject matter set forth in the specification. All directional references (e.g., upper, lower, upward, downward, left, right, leftward, rightward, top, bottom, above, below, vertical, horizontal, clockwise, and counterclockwise) are only used for identification purposes to aid the reader's understanding of the embodiments of the present disclosure, and do not create limitations, particularly as to the position, orientation, or use of the disclosure unless specifically set forth in the claims. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other.

As generally used herein, the terms "about", "substantially", and "approximately" refer to an acceptable degree of error for the quantity measured, given the nature or precision of the measurement. Typical exemplary degrees of error may be within 20%, within 10%, or within 5% of a given value or range of values.

In some instances, components are described with reference to "ends" having a particular characteristic and/or being connected to another part. However, those skilled in the art will recognize that the present disclosure is not limited to components which terminate immediately beyond their points of connection with other parts. Thus, the term "end" should be interpreted broadly, in a manner that includes areas adjacent, rearward, forward of, or otherwise near the terminus of a particular element, link, component, member or the like. In methodologies directly or indirectly set forth herein, various steps and operations are described in one possible order of operation, but those skilled in the art will recognize that steps and operations may be rearranged, replaced, or eliminated without necessarily departing from the spirit and scope of the present disclosure. It is intended that all matter contained in the above description or shown in the accompanying drawings shall be interpreted as illustrative only and not limiting. Changes in detail or structure may be made without departing from the spirit of the disclosure as defined in the appended claims.

The invention claimed is:

1. A method of calibrating a crank arm-mounted power meter, the method comprising:
   receiving an angle measurement from a first sensor of a power meter assembly, the power meter assembly disposed on a crank arm of a crank assembly, the angle measurement corresponding to an angular orientation of the crank arm;
   calculating, using a processor of the power meter assembly, a predicted load measurement based on the angle measurement and weight data for the crank assembly stored in a memory of the power meter assembly;
   receiving a load measurement from a second sensor of the power meter assembly, the load measurement corresponding to a load on the crank arm;
   calculating a zero offset value by determining a difference between the predicted load measurement and the load measurement; and
   updating power calculation logic for determining power based on load measurements obtained from one or more sensors disposed on the crank arm using the zero offset value.

2. The method of claim 1 further comprising obtaining the weight data of the crank assembly and storing the weight data of the crank assembly in the memory, wherein obtaining the weight data of the crank assembly comprises:
   disposing the crank arm in a plurality of angular orientations about a spindle; and
   for each of the plurality of angular orientations, obtaining a respective load measurement from the second sensor.

3. The method of claim 2, wherein calculating the predicted load comprises one of interpolating and extrapolating the predicted load based on the stored plurality of angular orientations and their respective load measurements and the angle measurement.

4. The method of claim 1 further comprising initiating a calibration process, wherein receiving the angle measurement and receiving the load measurement is performed during the calibration process.

5. The method of claim 4, wherein initiating the calibration process is in response to at least one of:
   receiving an initiation signal from a computing device communicatively coupled to the processor of the power meter assembly;
   measuring one or more revolutions of the crank arm in a backpedal direction;
   determining the crank arm has not moved for a first time period;
   determining the crank arm is loaded below a threshold; and
   determining the crank arm is both loaded below the threshold load and has been loaded below the threshold for a second time period.

6. The method of claim 4, wherein initiating the calibration process further comprises determining the crank arm is oriented along a substantially vertical plane.

7. The method of claim 1 further comprising storing the zero offset value in the memory of the power meter assembly.

8. The method of claim 1, wherein the load on the crank arm is a gravitational load.

9. The method of claim 1, wherein the first sensor includes an accelerometer and the second sensor includes a strain gauge.

10. The method of claim 1 further comprising, during pedaling of the crank arm, applying the power calculation logic to calculate power applied to the crank arm, wherein applying the power calculation logic comprises applying the zero offset value to a second load measurement received from the second sensor.

11. A crank arm comprising:
    a crank arm body; and
    a power meter assembly coupled to the crank arm body, the power meter assembly comprising a processor communicatively coupled to a memory, the processor configured to:
       obtain each of an angle measurement of the crank arm body and a load measurement of loads acting on the crank arm body;
       calculate a predicted load value based, at least in part, on the angle measurement and weight data stored in the memory;
       calculate a zero offset value by determining a difference between the predicted load value and the load measurement; and
       update power calculation logic executable by the processor using the zero offset value.

12. The crank arm of claim 11, wherein the power meter assembly further comprises:
    a first sensor communicatively coupled to the processor and configured to measure angular orientation of the crank arm body; and
    a second sensor communicatively coupled to the processor configured to measure load on the crank arm body, wherein the processor is configured to obtain the angle measurement from the first sensor and to obtain the load measurement from the second sensor.

13. The crank arm of claim 12, wherein the first sensor includes an accelerometer.

14. The crank arm of claim 12, wherein the second sensor includes a strain gauge.

15. The crank arm of claim 11, wherein the processor is further configured to:
   obtain and store in the memory a plurality of angle measurements and respective load measurements, and
   calculate the predicted load value by one of interpolating and extrapolating the predicted load value based on the plurality of stored angle measurements and their respective load measurements and the angle measurement.

16. The crank arm of claim 11, wherein the processor is further configured to obtain each of the angular orientation measurement and the load measurement in response to initiating a calibration process.

17. The crank arm of claim 15, wherein the processor is configured to initiate the calibration process in response to at least one of:
   receiving an initiation signal from a computing device communicatively coupled to the processor of the power meter assembly;
   measuring one or more revolutions of the crank arm in a backpedal direction;
   determining the crank arm body has not moved for a first time period;
   determining the crank arm body is loaded below a threshold; and
   determining the crank arm body is both loaded below the threshold load and has been loaded below the threshold for a second time period.

18. The crank arm of claim 11, wherein the processor is further configured to store the zero offset value in the memory.

19. A method of calibrating a crank arm-mounted power meter comprising:
   disposing a crank arm of a crank assembly in a plurality of discrete angular orientations about a spindle; and
   for each of the plurality of discrete angular orientations, obtaining, at a processor of a power meter assembly disposed on the crank arm, a respective load measurement corresponding to a load on the crank arm as measured at the respective discrete angular orientation; and
   storing calibration data in a memory communicatively coupled to the processor, the calibration data including each of the plurality of discrete angular orientations and their respective load measurements,
   wherein the processor is configured to determine a predicted load value based on the calibration data and an angle measurement of the crank arm.

20. The method of claim 19, further comprising:
   receiving, at the processor, the angle measurement of the crank arm and a corresponding load on the crank arm;
   determining, based on the angle measurement, the predicted load value by at least one of interpolating and extrapolating the calibration data based on the angle measurement; and
   calculating an offset to be applied to subsequent load measurements by determining a difference between the predicted load value and the load on the crank arm corresponding to the angle measurement.

* * * * *